United States Patent
Miyazawa

(10) Patent No.: US 9,880,376 B2
(45) Date of Patent: Jan. 30, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Nobuyuki Miyazawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 14/945,929

(22) Filed: Nov. 19, 2015

(65) Prior Publication Data
US 2016/0154226 A1    Jun. 2, 2016

(30) Foreign Application Priority Data

Nov. 28, 2014 (JP) ................ 2014-240825
Nov. 28, 2014 (JP) ................ 2014-240827

(51) Int. Cl.
| G02B 27/64 | (2006.01) |
| G02B 15/20 | (2006.01) |
| G02B 15/173 | (2006.01) |
| G02B 27/00 | (2006.01) |

(52) U.S. Cl.
CPC .......... *G02B 15/20* (2013.01); *G02B 15/173* (2013.01); *G02B 27/0025* (2013.01); *G02B 27/646* (2013.01)

(58) Field of Classification Search
CPC .. G03B 2205/0007; G03B 5/02; G03B 13/36; G03B 17/02; G03B 17/14; G03B 2205/0046; G03B 2205/0053
See application file for complete search history.

(56) References Cited

U.S. PATENT DOCUMENTS

2013/0003191 A1    1/2013 Kanai
2014/0139720 A1    5/2014 Ogata et al.

FOREIGN PATENT DOCUMENTS

| CN | 102004303 A | 4/2011 |
| CN | 102401985 A | 4/2012 |
| CN | 104101991 A | 10/2014 |
| JP | 2007-225821 A | 9/2007 |

(Continued)

OTHER PUBLICATIONS

Extended European Search Report issued in corresponding EP Application No. 15003219.1 dated Apr. 4, 2016 (6 pages).

(Continued)

*Primary Examiner* — Bumsuk Won
*Assistant Examiner* — Tamara Y Washington
(74) *Attorney, Agent, or Firm* — Cater, DeLuca, Farrell & Schmidt, LLP

(57) ABSTRACT

Provided is a zoom lens, including, in order from an object side to an image side: first to fourth lens units respectively having positive, negative, positive and negative refractive powers; and a fifth lens unit having a positive or negative refractive power. In the zoom lens, intervals between adjacent lens units are changed during zooming. The third lens unit includes four or more lenses, and in the third lens unit, a lens arranged closest to the image side, a lens arranged second when counted from the image side, and a lens arranged third when counted from the image side are arranged with air gaps therebetween. A focal length of the zoom lens at a telephoto end, and a movement amount of the first lens unit during zooming from a wide-angle end to the telephoto end are set appropriately.

20 Claims, 16 Drawing Sheets

(56) References Cited

FOREIGN PATENT DOCUMENTS

| JP | 2007-264174 A | 10/2007 |
| JP | 2011-237588 A | 11/2011 |
| JP | 2013-117667 A | 6/2013 |

OTHER PUBLICATIONS

Office Action for corresponding Chinese Application No. 201510831576.7 dated Jul. 26, 2017.

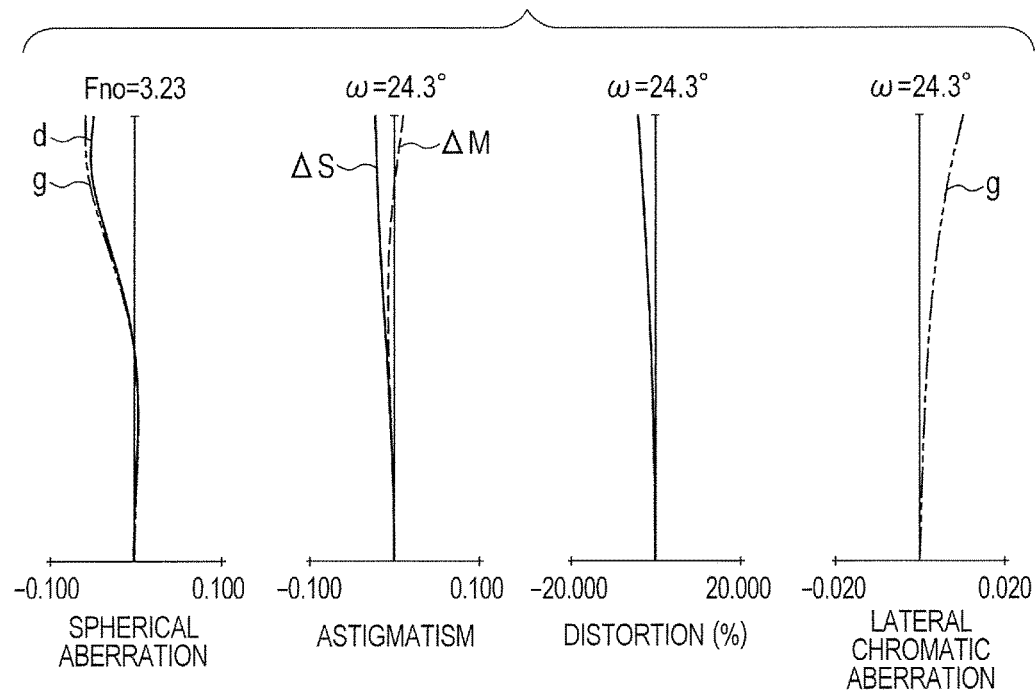
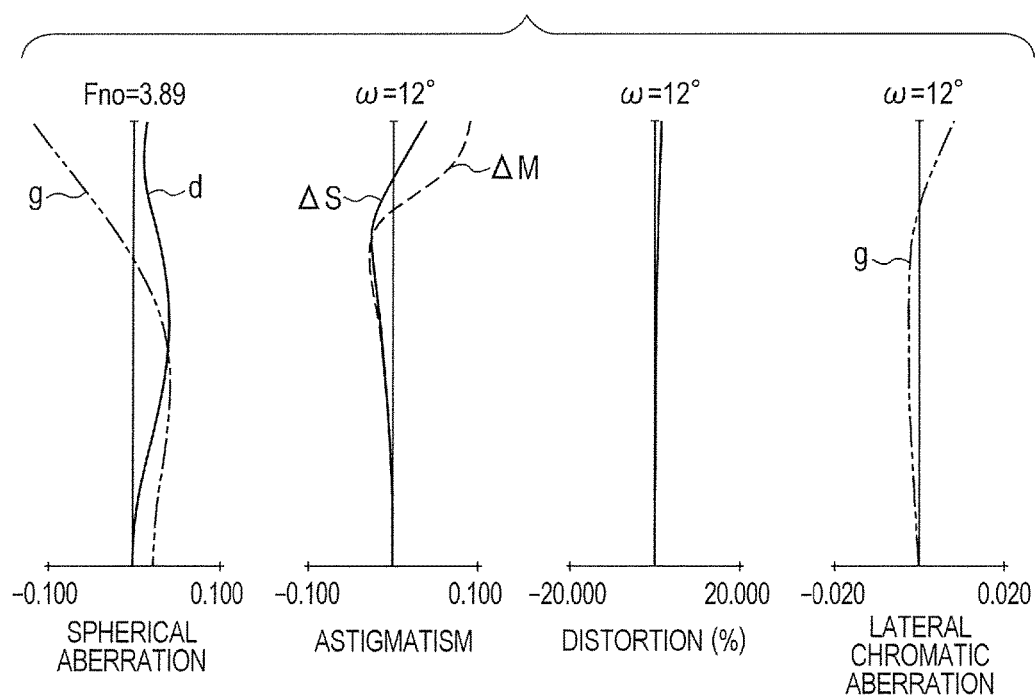

ZOOM LENS AND IMAGE PICKUP APPARATUS INCLUDING THE SAME

BACKGROUND OF THE INVENTION

Field of the Invention

The present invention relates to a zoom lens, which is suitable for, for example, an image pickup optical system used in an image pickup apparatus such as a digital still camera, a video camera, a monitoring camera, a broadcasting camera, a silver-halide film camera, or the like.

Description of the Related Art

In recent years, in an image pickup apparatus using a solid-state image pickup element, the solid-state image pickup element is increased in size, which accompanies increased functionality of the image pickup apparatus or downsizing of the entire apparatus. Then, as an image pickup optical system used with the image pickup apparatus, a zoom lens that is bright and has a wide angle of view at a wide-angle end, a high zoom ratio, and high optical performance over an entire zoom range has been sought for. As a zoom lens satisfying those demands, there is known a five-unit zoom lens including, in order from an object side to an image side, first to fifth lens units respectively having positive, negative, positive, negative, and positive refractive powers.

In Japanese Patent Application Laid-Open No. 2007-264174, there is disclosed a zoom lens in which a first lens unit to a third lens unit, and a fifth lens unit are configured to move during zooming, and which has a zoom ratio of about 10. In Japanese Patent Application Laid-Open No. 2013-117667, there is disclosed a zoom lens in which lens units are configured to move during zooming, in which a fourth lens unit is configured to move during focusing, and which has a zoom ratio of about 5.

With the five-unit zoom lens having the above-mentioned refractive power arrangement, it is relatively easy to downsize the zoom lens, to realize a large aperture ratio, the wide angle of view, and the high zoom ratio, and to obtain the high optical performance. However, when a focal length at a telephoto end is to be increased to further increase the zoom ratio while realizing the large aperture ratio, various aberrations such as spherical aberration, astigmatism, and chromatic aberration are increased, and hence it is difficult to maintain the high optical performance. In particular, when an f-number is to be reduced for brightness, the occurrence of the various aberrations such as the spherical aberration and coma is increased at the telephoto end. Moreover, when the angle of view is to be increased, the occurrence of the various aberrations such as the astigmatism and lateral chromatic aberration is increased at the wide-angle end, and a front lens diameter is increased.

In the five-unit zoom lens, in order to downsize the zoom lens, to realize the large aperture ratio, the wide angle of view, and the high zoom ratio, and to obtain the high optical performance over the entire zoom range, refractive powers and lens configurations of the lens units are appropriately set. In addition, it is important to appropriately set movement conditions and the like of the lens units accompanying zooming.

SUMMARY OF THE INVENTION

According to one embodiment of the present invention, there is provided a zoom lens, including, in order from an object side to an image side:

a first lens unit having a positive refractive power;
a second lens unit having a negative refractive power;
a third lens unit having a positive refractive power;
a fourth lens unit having a negative refractive power; and
a fifth lens unit having a positive or negative refractive power, in which intervals between adjacent lens units are changed during zooming, in which the third lens unit includes four or more lenses, and in the third lens unit, a lens arranged closest to the image side, a lens arranged second when counted from the image side, and a lens arranged third when counted from the image side are arranged with air gaps therebetween, and in which the following conditional expression is satisfied:

$$-0.8 < M1/ft < -0.4$$

where ft represents a focal length of the zoom lens at a telephoto end, and M1 represents a movement amount of the first lens unit during zooming from a wide-angle end to the telephoto end, provided that a sign of the movement amount is negative when the first lens unit is located on the object side at the telephoto end with respect to the wide-angle end, and is positive when the first lens unit is located on the image side at the telephoto end with respect to the wide-angle end.

Further, according to one embodiment of the present invention, there is provided a zoom lens, including, in order from an object side to an image side:

a first lens unit having a positive refractive power;
a second lens unit having a negative refractive power;
a third lens unit having a positive refractive power;
a fourth lens unit having a negative refractive power; and
a fifth lens unit having a positive or negative refractive power, in which intervals between adjacent lens units are changed during zooming, in which the second lens unit includes four or less lenses, the third lens unit includes four or more lenses, and of a lens arranged closest to the image side and a lens arranged second when counted from the image side in the third lens unit, one is a positive lens, and the other is a negative lens, and in which the following conditional expressions are satisfied:

$$-1.9 < f3/f2 < -1.2$$

$$-0.8 < M1/ft < -0.4$$

where f2 represents a focal length of the second lens unit, f3 represents a focal length of the third lens unit, ft represents a focal length of the zoom lens at a telephoto end, and M1 represents a movement amount of the first lens unit during zooming from the wide-angle end to the telephoto end, provided that a sign of the movement amount is negative when the first lens unit is located on the object side at the telephoto end with respect to the wide-angle end, and is positive when the first lens unit is located on the image side at the telephoto end with respect to the wide-angle end.

Further features of the present invention will become apparent from the following description of exemplary embodiments with reference to the attached drawings.

BRIEF DESCRIPTION OF THE DRAWINGS

FIG. 12B is a diagram for showing various aberrations at an intermediate zoom position of the zoom lens according to Embodiment 6.

FIG. 12C is a diagram for showing various aberrations at a telephoto end of the zoom lens according to Embodiment 6.

DESCRIPTION OF THE EMBODIMENTS

Preferred embodiments of the present invention are hereinafter described with reference to the attached drawings. A zoom lens according to the present invention includes, in order from an object side to an image side: a first lens unit having a positive refractive power; a second lens unit having a negative refractive power; a third lens unit having a positive refractive power; a fourth lens unit having a negative refractive power; and a fifth lens unit having one of a positive refractive power and a negative refractive power. Intervals between adjacent lens units are changed during zooming.

Figure 1:
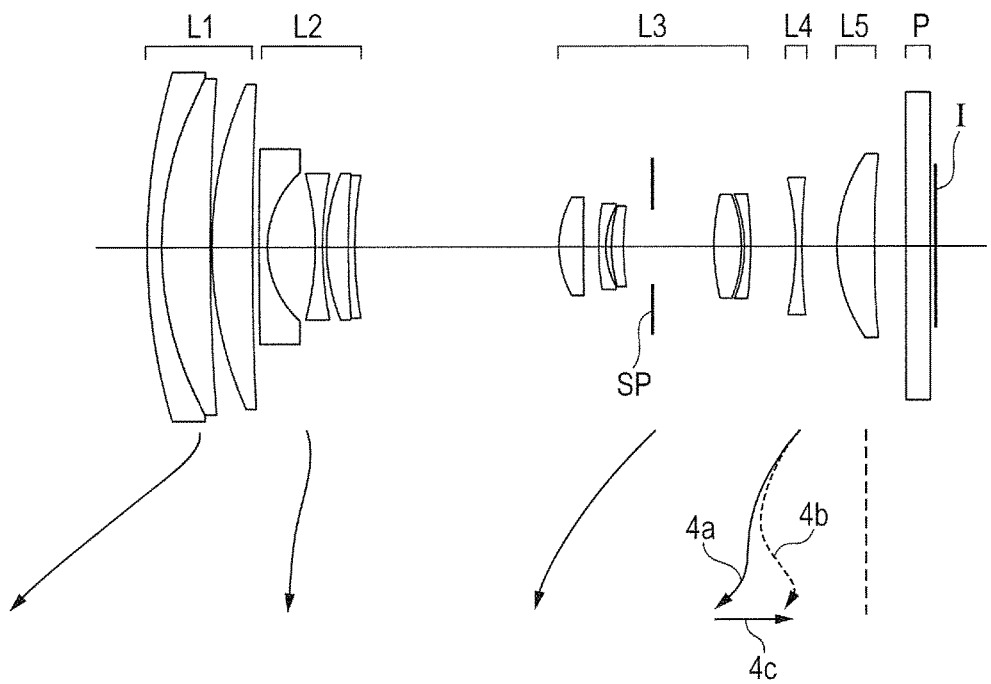
FIG. 1 is a lens cross-sectional view at a wide angle end of a zoom lens according to Embodiment 1 of the present invention.
Figure 2A:
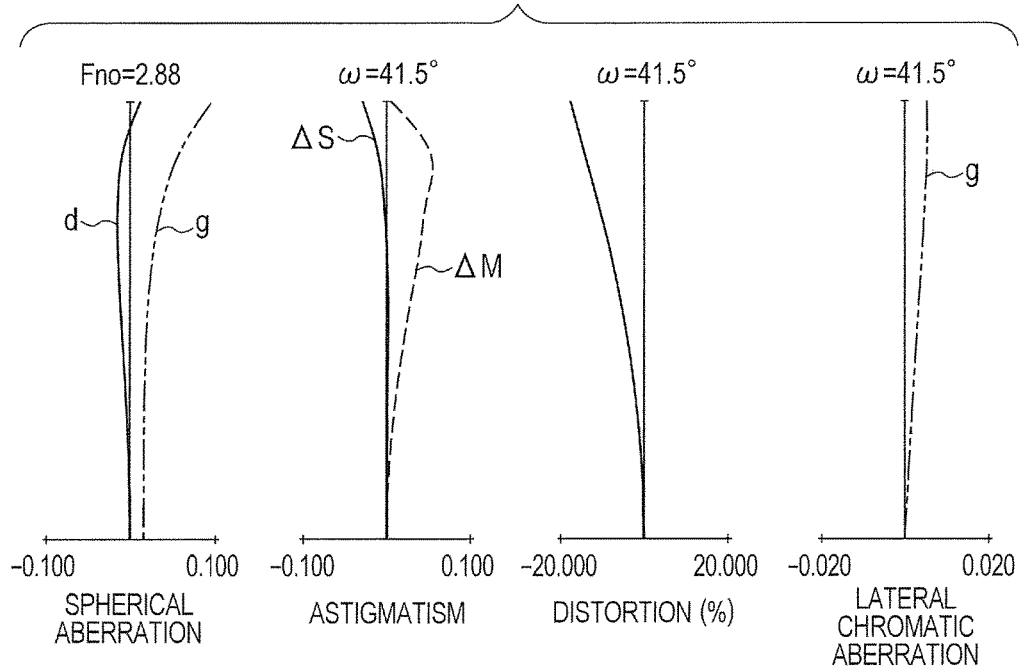
FIG. 2A is a diagram for showing various aberrations at the wide angle end of the zoom lens according to Embodiment 1.
Figure 2B:
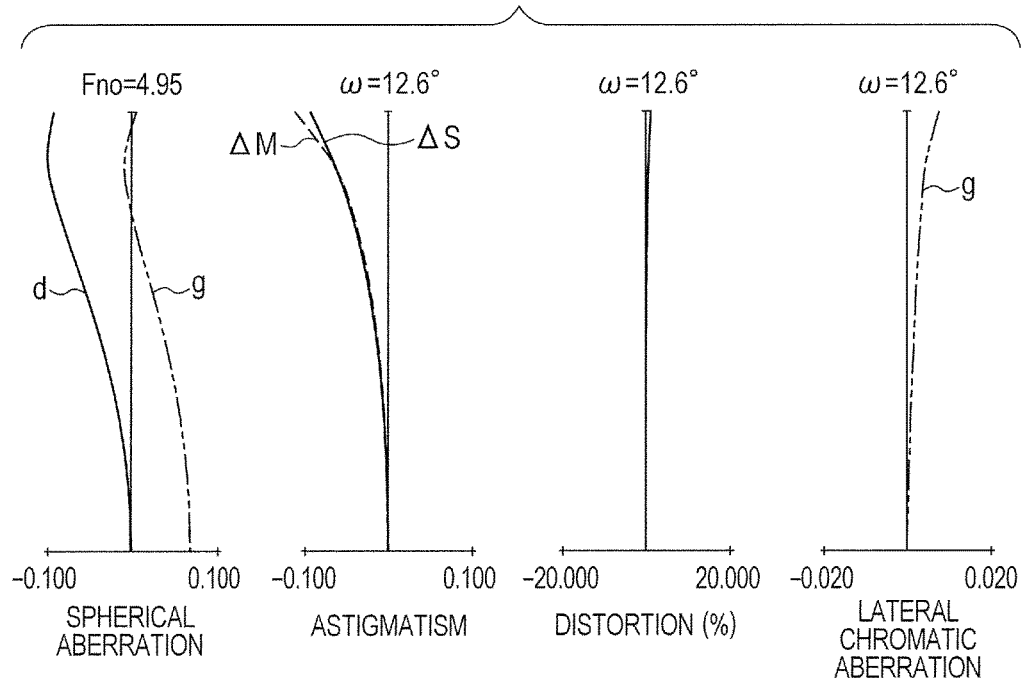
FIG. 2B is a diagram for showing various aberrations at an intermediate zoom position of the zoom lens according to Embodiment 1.
Figure 2C:
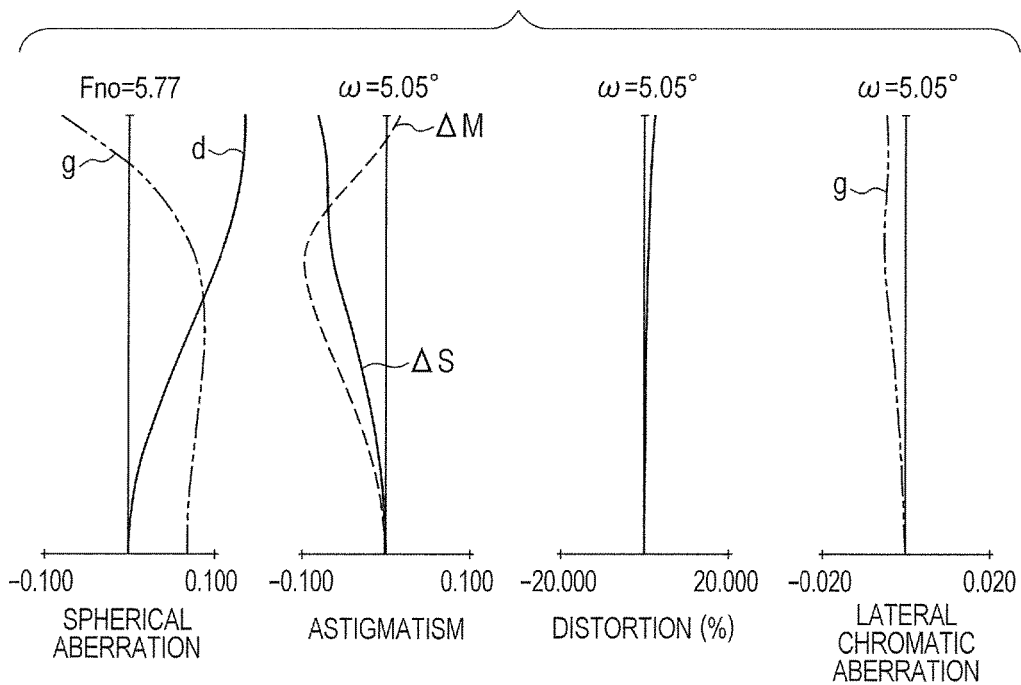
FIG. 2C is a diagram for showing various aberrations at a telephoto end of the zoom lens according to Embodiment 1.

FIG. 1 is a lens cross-sectional view at a wide angle end (short focal length end) of a zoom lens according to Embodiment 1 of the present invention. FIGS. 2A, 2B, and 2C are aberration diagrams at the wide angle end, an intermediate zoom position, and a telephoto end (long focal length end), respectively, of the zoom lens of Embodiment 1. The zoom lens of Embodiment 1 has a zoom ratio of 9.64 and F number of from 2.88 to 5.77.

Figure 3:
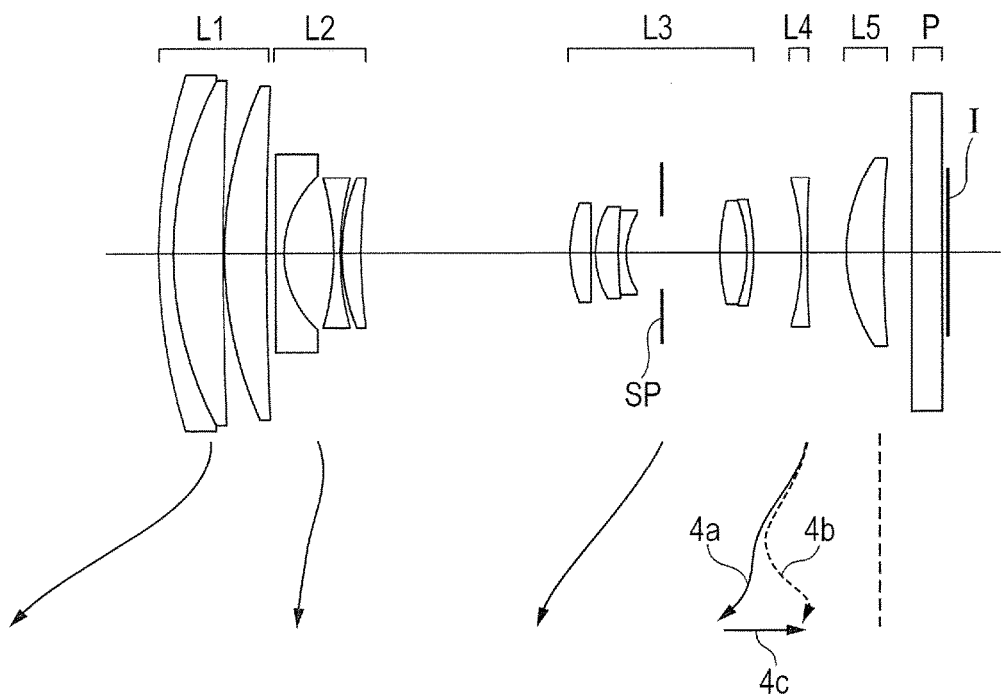
FIG. 3 is a lens cross-sectional view at a wide angle end of a zoom lens according to Embodiment 2 of the present invention.
Figure 4A:
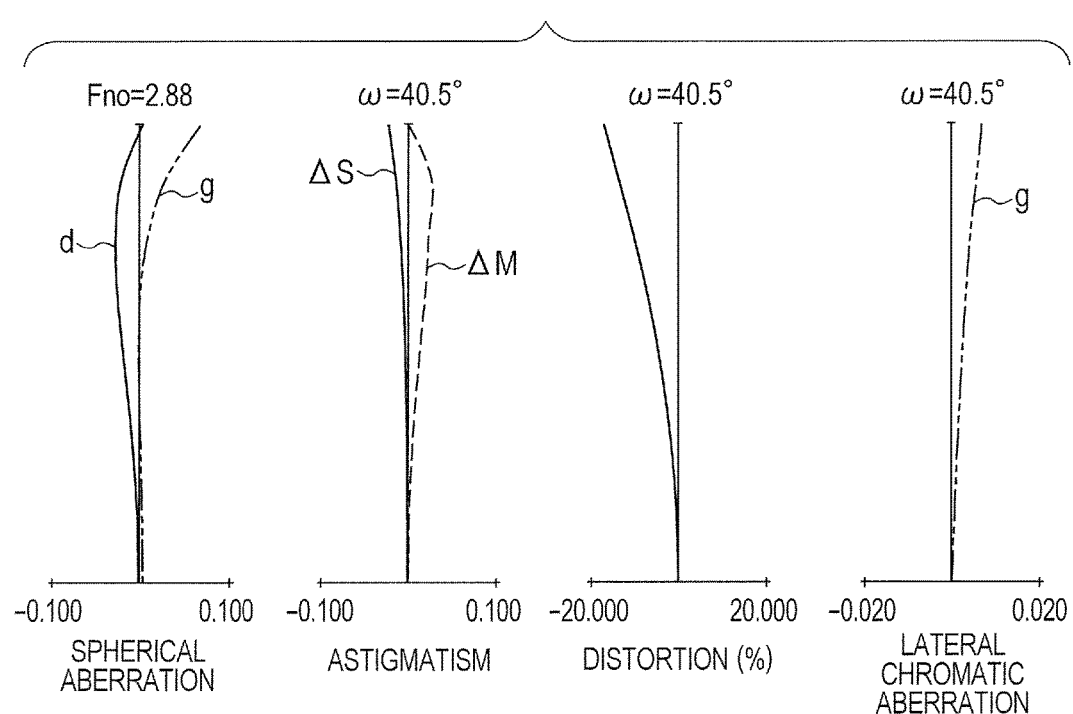
FIG. 4A is a diagram for showing various aberrations at the wide angle end of the zoom lens according to Embodiment 2.
Figure 4B:
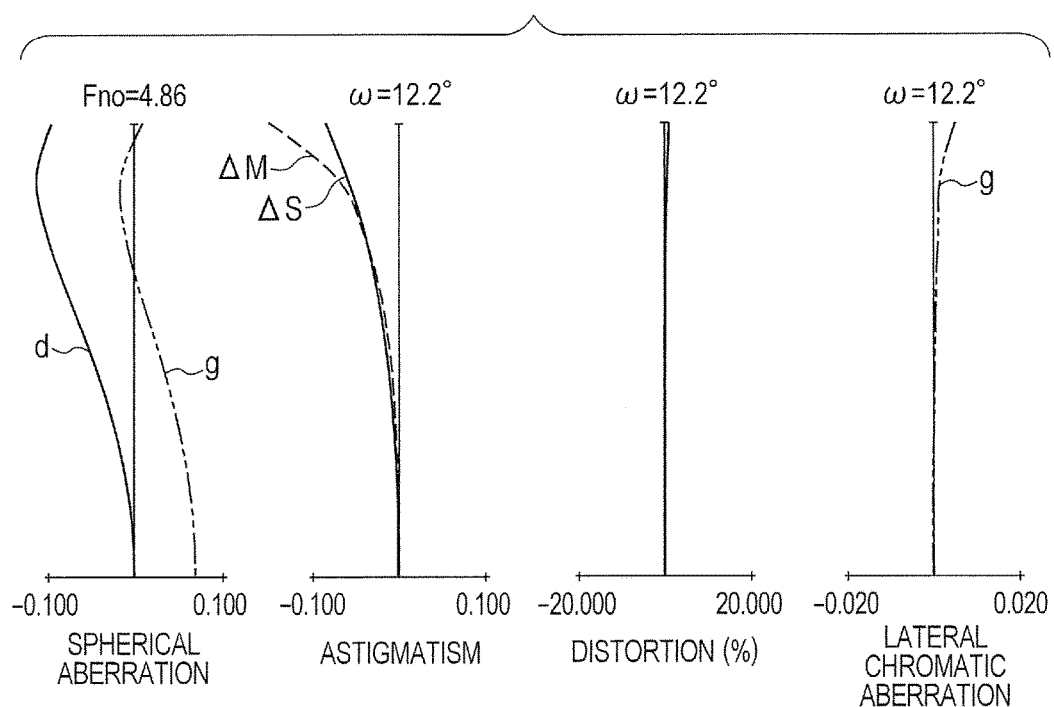
FIG. 4B is a diagram for showing various aberrations at an intermediate zoom position of the zoom lens according to Embodiment 2.
Figure 4C:
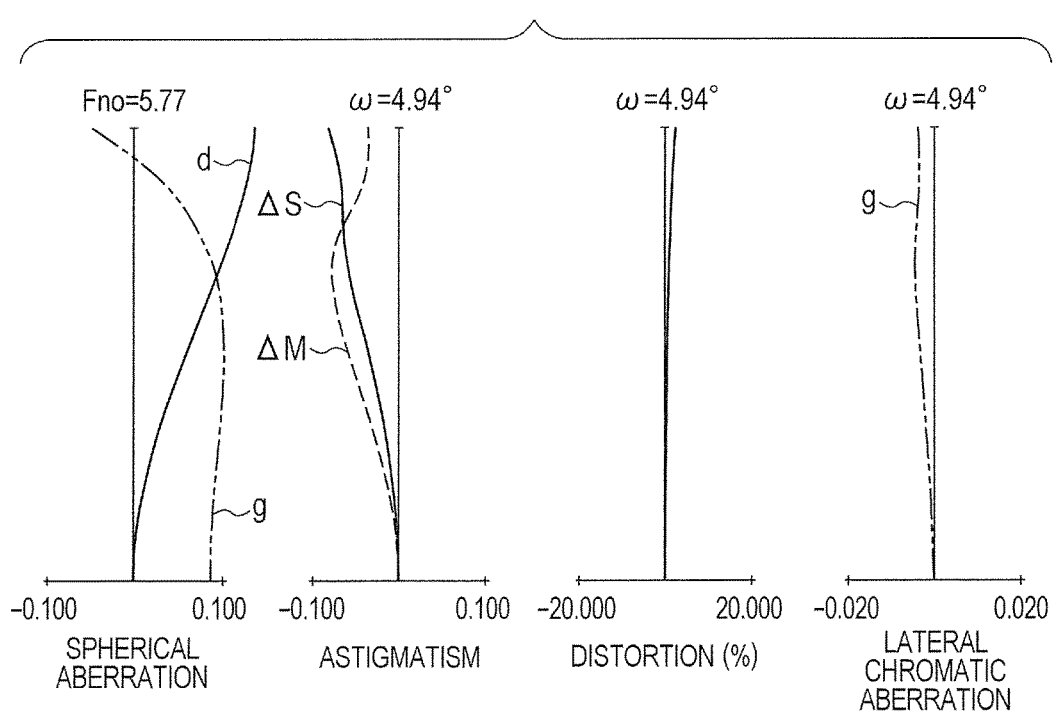
FIG. 4C is a diagram for showing various aberrations at a telephoto end of the zoom lens according to Embodiment 2.

FIG. 3 is a lens cross-sectional view at a wide angle end of a zoom lens according to Embodiment 2 of the present invention. FIGS. 4A, 4B, and 4C are aberration diagrams at the wide angle end, an intermediate zoom position, and a telephoto end, respectively, of the zoom lens of Embodiment 2. The zoom lens of Embodiment 2 has a zoom ratio of 9.56 and F number of from 2.88 to 5.77.

Figure 5:
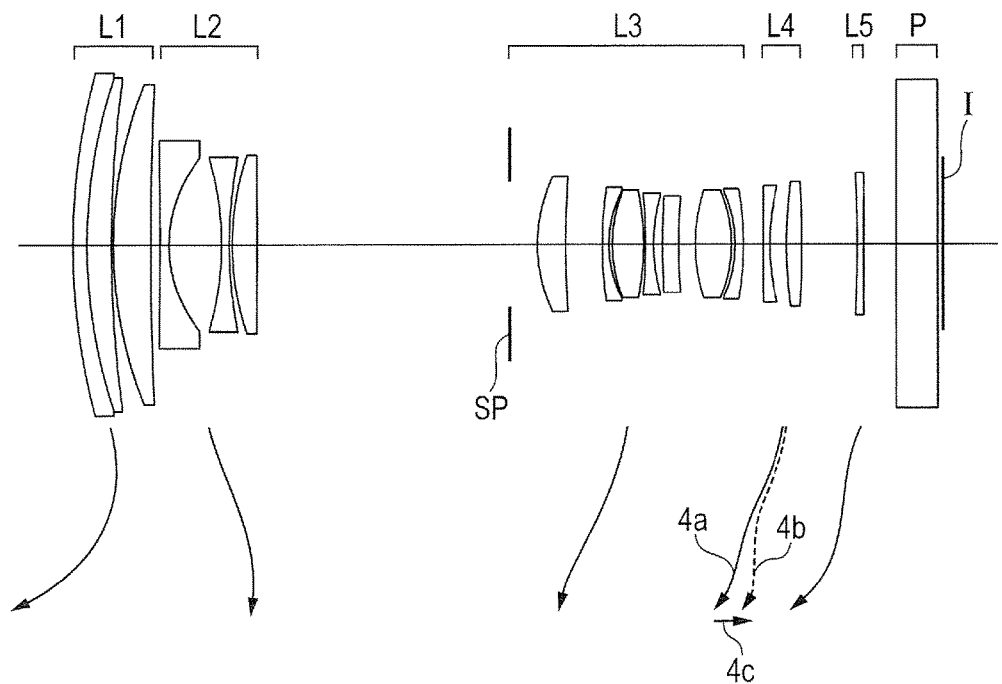
FIG. 5 is a lens cross-sectional view at a wide angle end of a zoom lens according to Embodiment 3 of the present invention.
Figure 6A:
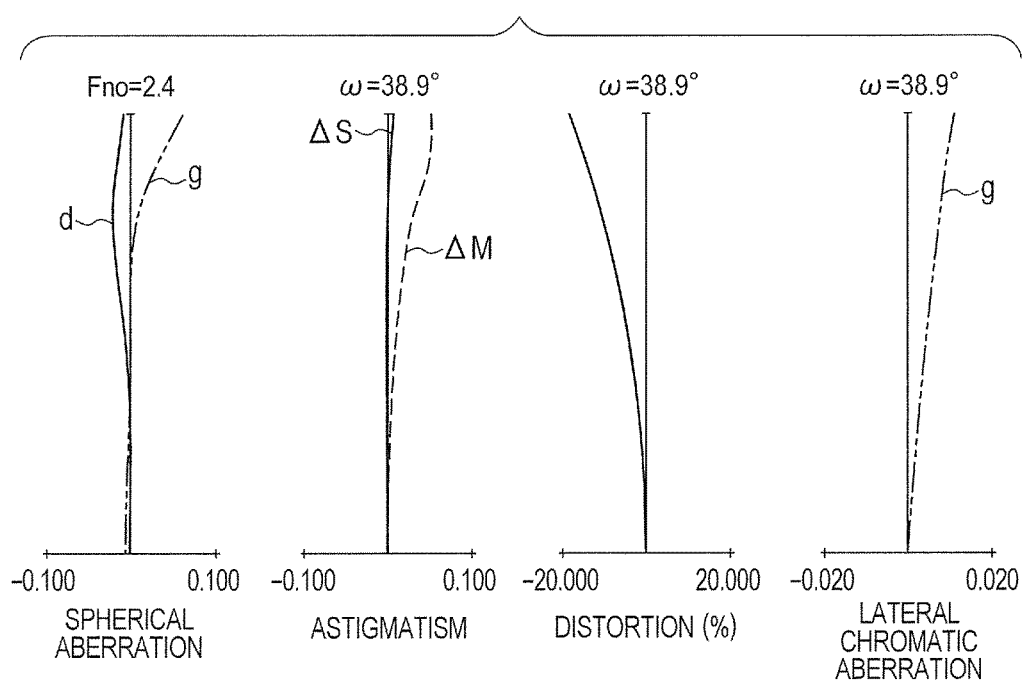
FIG. 6A is a diagram for showing various aberrations at the wide angle end of the zoom lens according to Embodiment 3.
Figure 6B:
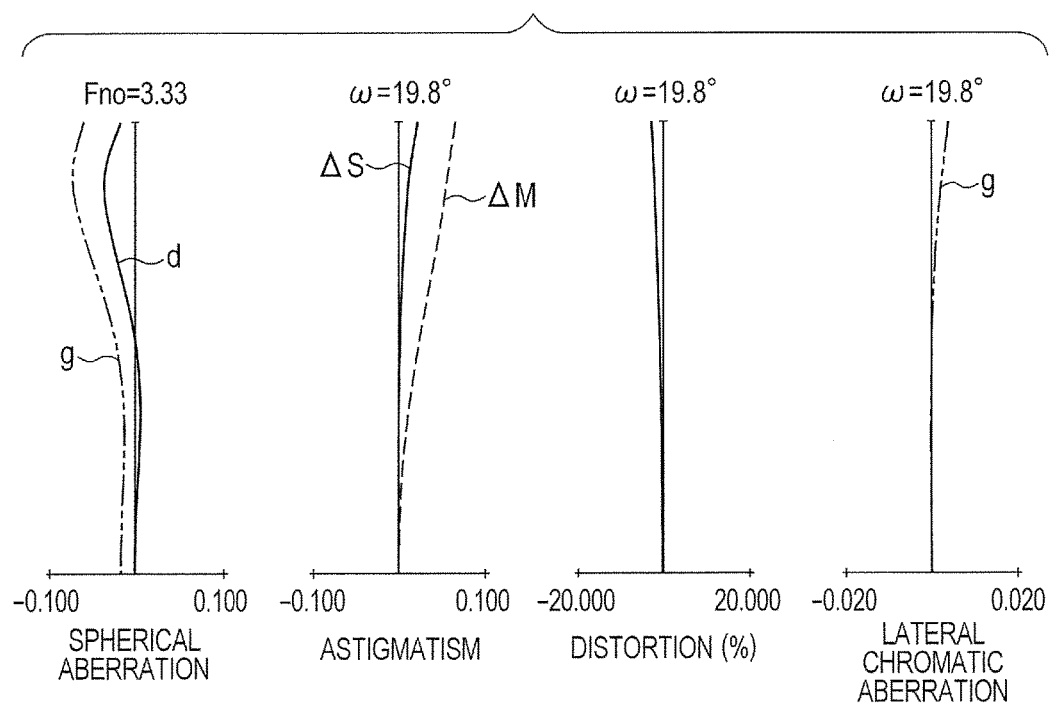
FIG. 6B is a diagram for showing various aberrations at an intermediate zoom position of the zoom lens according to Embodiment 3.
Figure 6C:
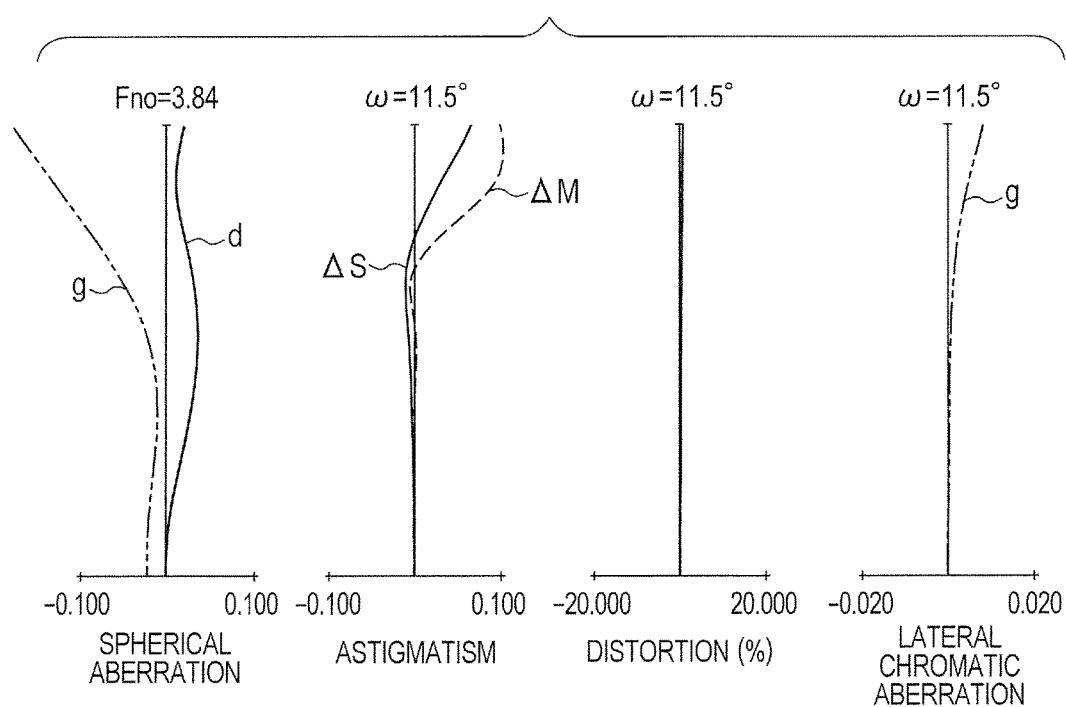
FIG. 6C is a diagram for showing various aberrations at a telephoto end of the zoom lens according to Embodiment 3.

FIG. 5 is a lens cross-sectional view at a wide angle end of a zoom lens according to Embodiment 3 of the present invention. FIGS. 6A, 6B, and 6C are aberration diagrams at the wide angle end, an intermediate zoom position, and a telephoto end, respectively, of the zoom lens of Embodiment 3. The zoom lens of Embodiment 3 has a zoom ratio of 3.80 and F number of from 2.40 to 3.84.

Figure 7:
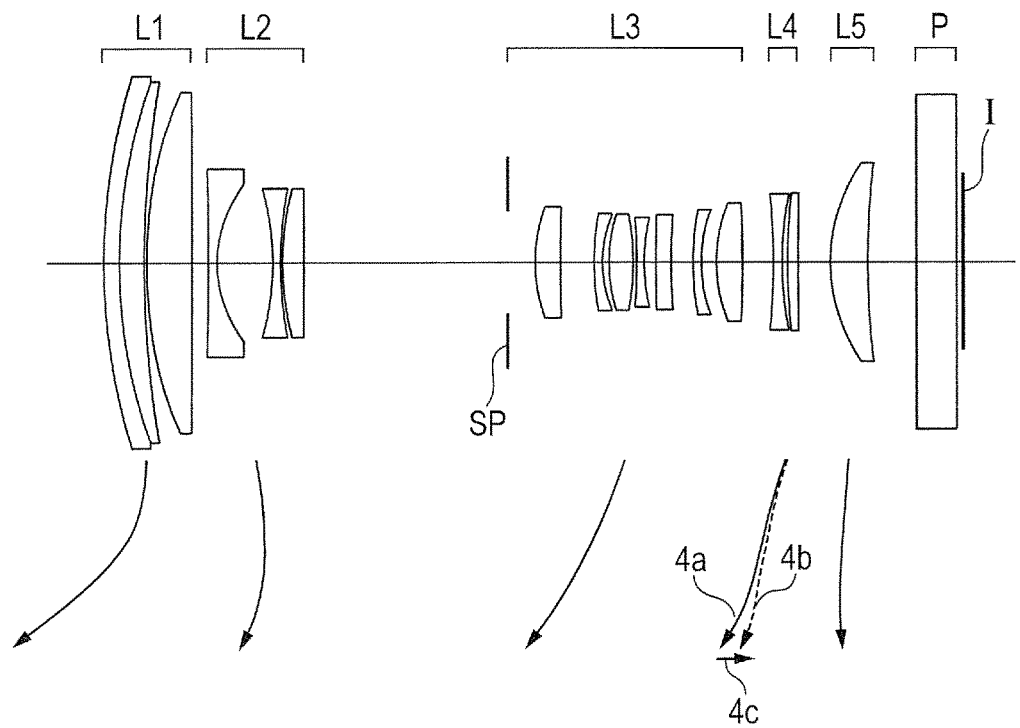
FIG. 7 is a lens cross-sectional view at a wide angle end of a zoom lens according to Embodiment 4 of the present invention.
Figure 8A:
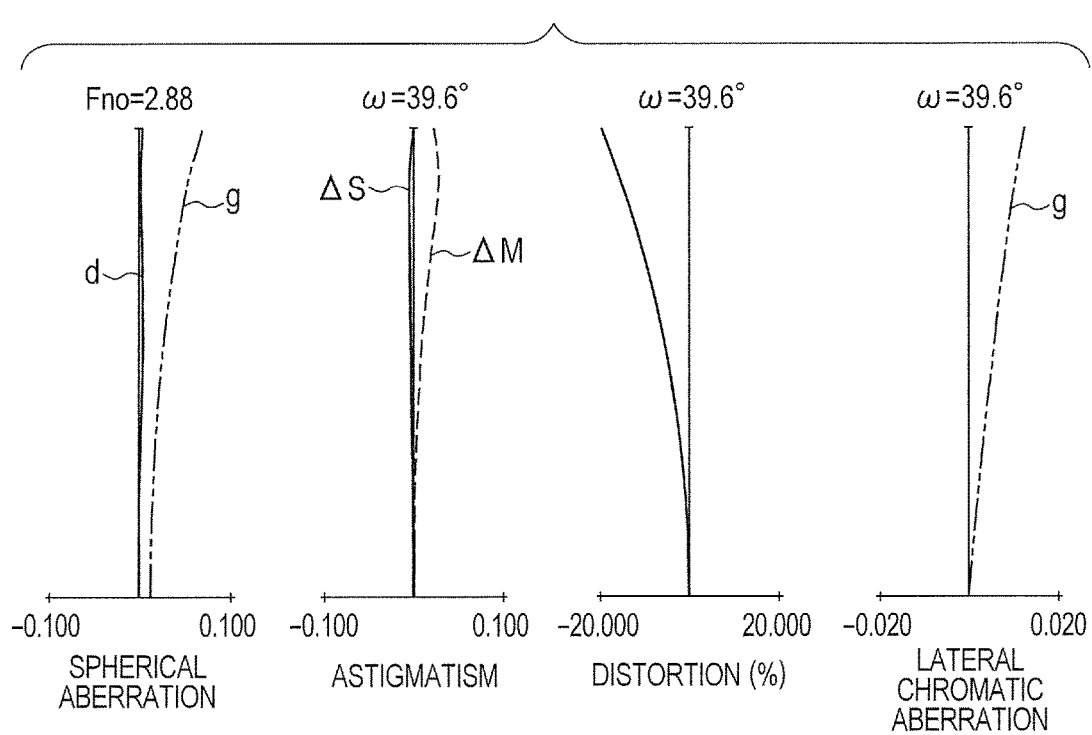
FIG. 8A is a diagram for showing various aberrations at the wide angle end of the zoom lens according to Embodiment 4.
Figure 8B:
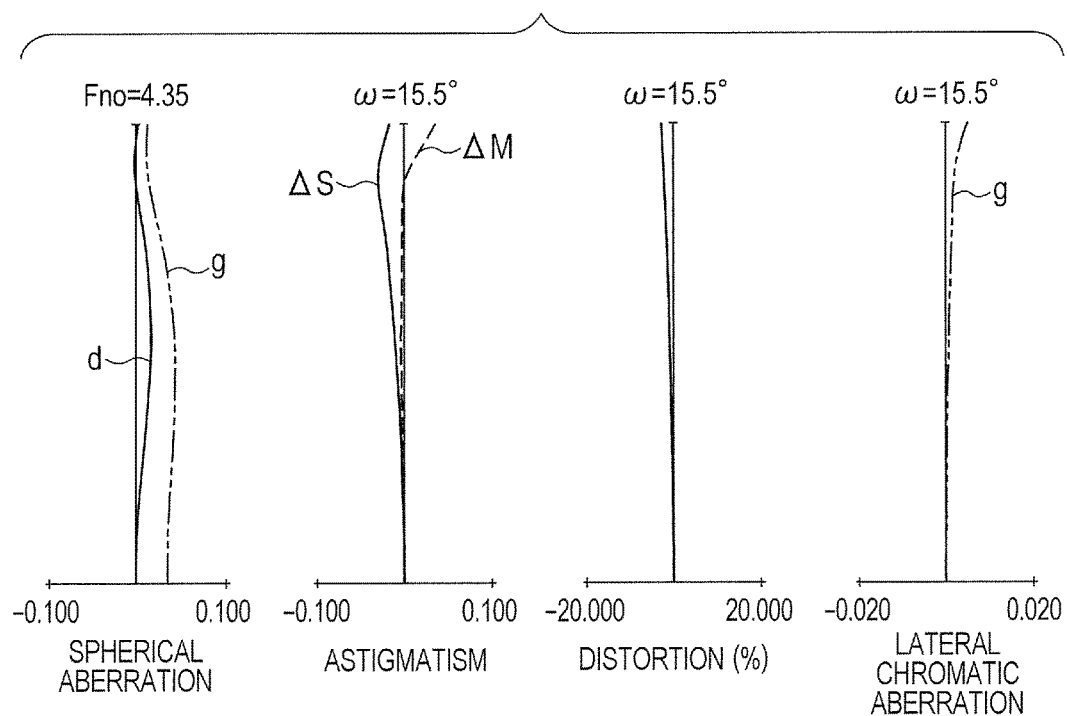
FIG. 8B is a diagram for showing various aberrations at an intermediate zoom position of the zoom lens according to Embodiment 4.
Figure 8C:
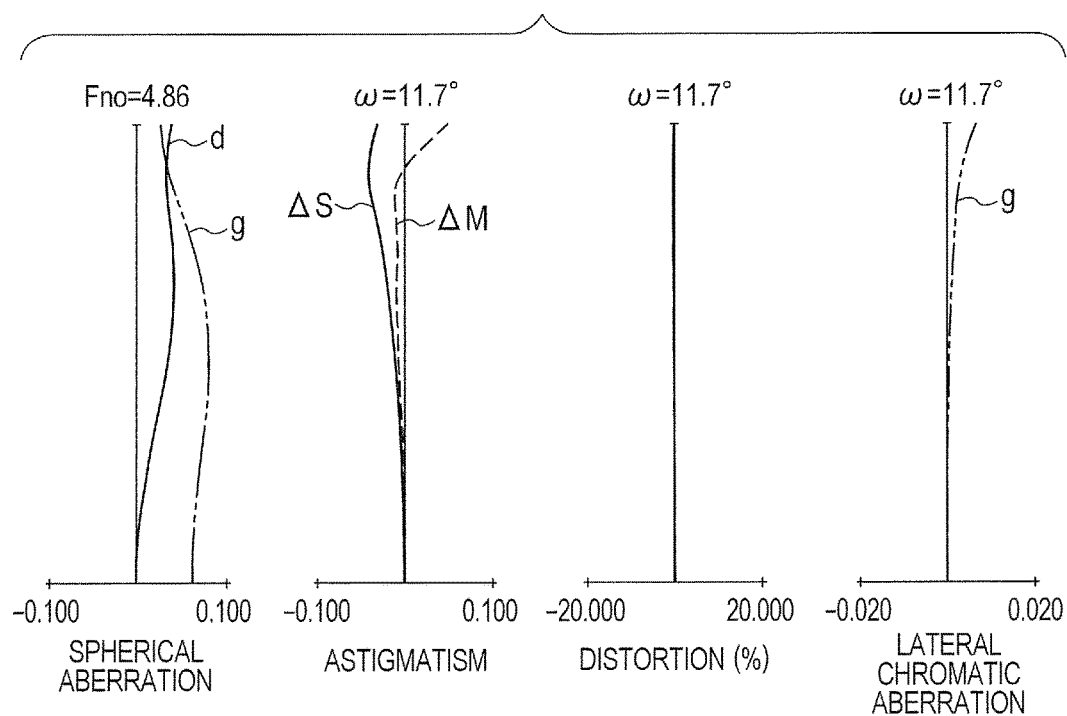
FIG. 8C is a diagram for showing various aberrations at a telephoto end of the zoom lens according to Embodiment 4.

FIG. 7 is a lens cross-sectional view at a wide angle end of a zoom lens according to Embodiment 4 of the present invention. FIGS. 8A, 8B, and 8C are aberration diagrams at the wide angle end, an intermediate zoom position, and a telephoto end, respectively, of the zoom lens of Embodiment 4. The zoom lens of Embodiment 4 has a zoom ratio of 3.80 and F number of from 2.88 to 4.86.

Figure 9:
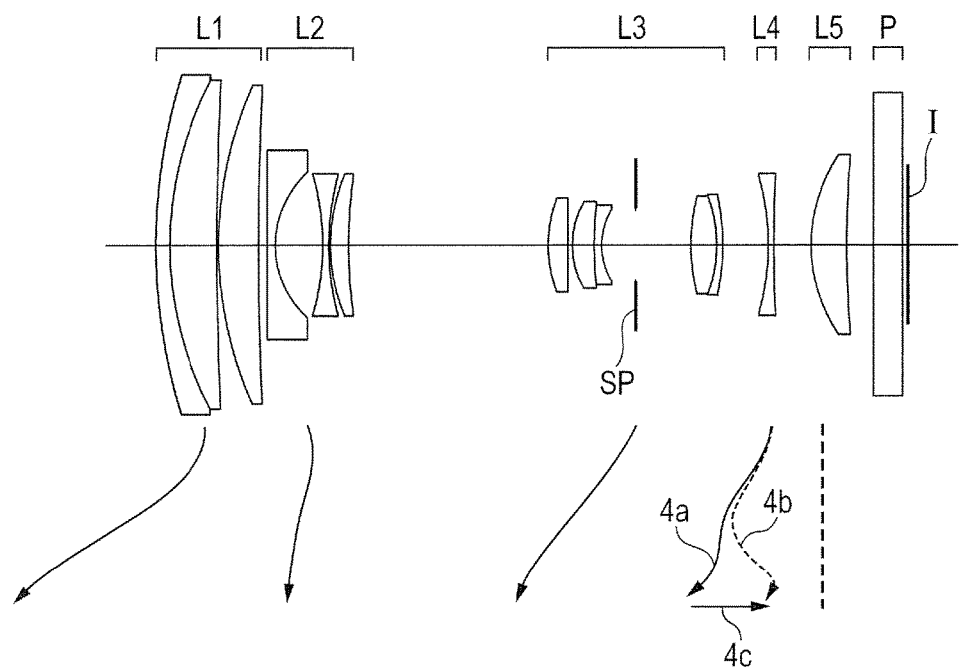
FIG. 9 is a lens cross-sectional view at a wide angle end of a zoom lens according to Embodiment 5 of the present invention.
Figure 10A:
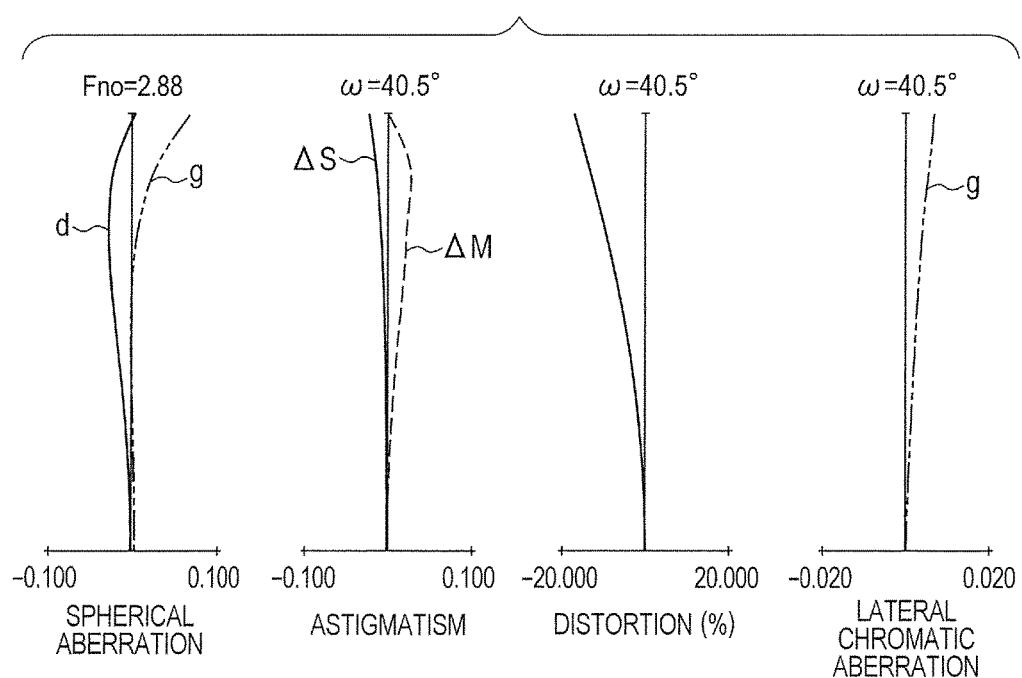
FIG. 10A is a diagram for showing various aberrations at the wide angle end of the zoom lens according to Embodiment 5.
Figure 10B:
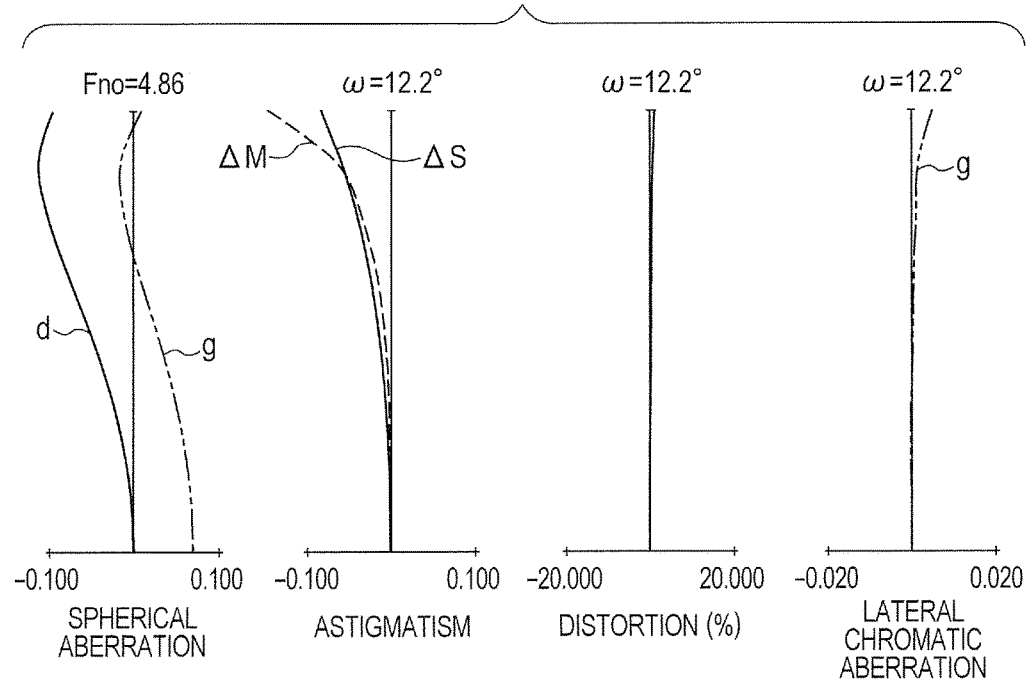
FIG. 10B is a diagram for showing various aberrations at an intermediate zoom position of the zoom lens according to Embodiment 5.
Figure 10C:
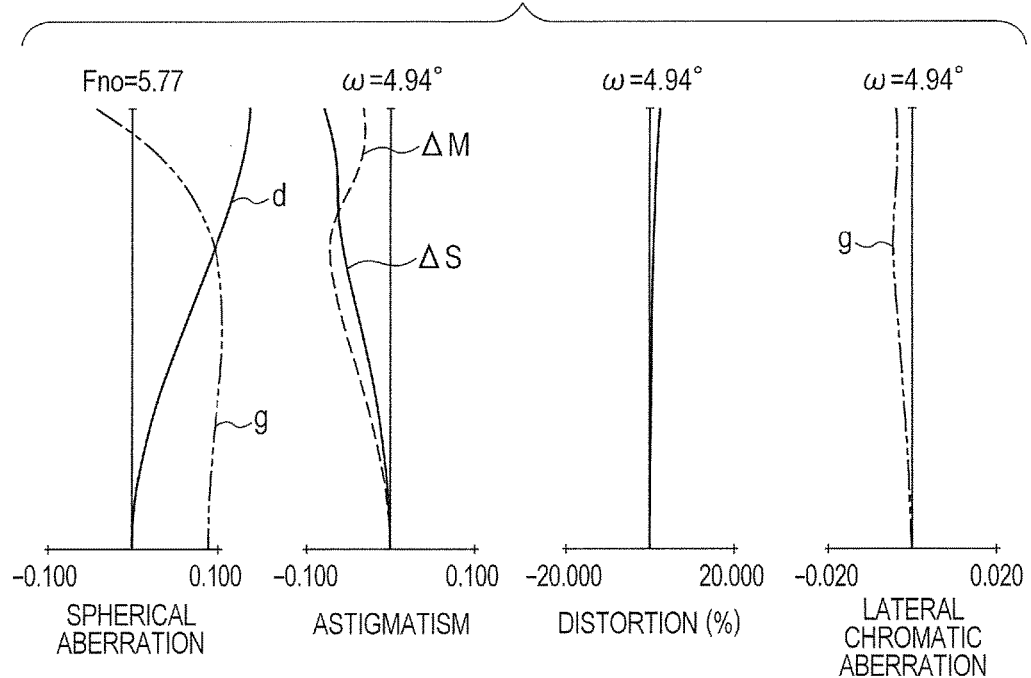
FIG. 10C is a diagram for showing various aberrations at a telephoto end of the zoom lens according to Embodiment 5.

FIG. 9 is a lens cross-sectional view at a wide angle end of a zoom lens according to Embodiment 5 of the present invention. FIGS. 10A, 10B, and 10C are aberration diagrams at the wide angle end, an intermediate zoom position, and a telephoto end, respectively, of the zoom lens of Embodiment 5. The zoom lens of Embodiment 5 has a zoom ratio of 9.55 and F number of from 2.88 to 5.77.

Figure 11:
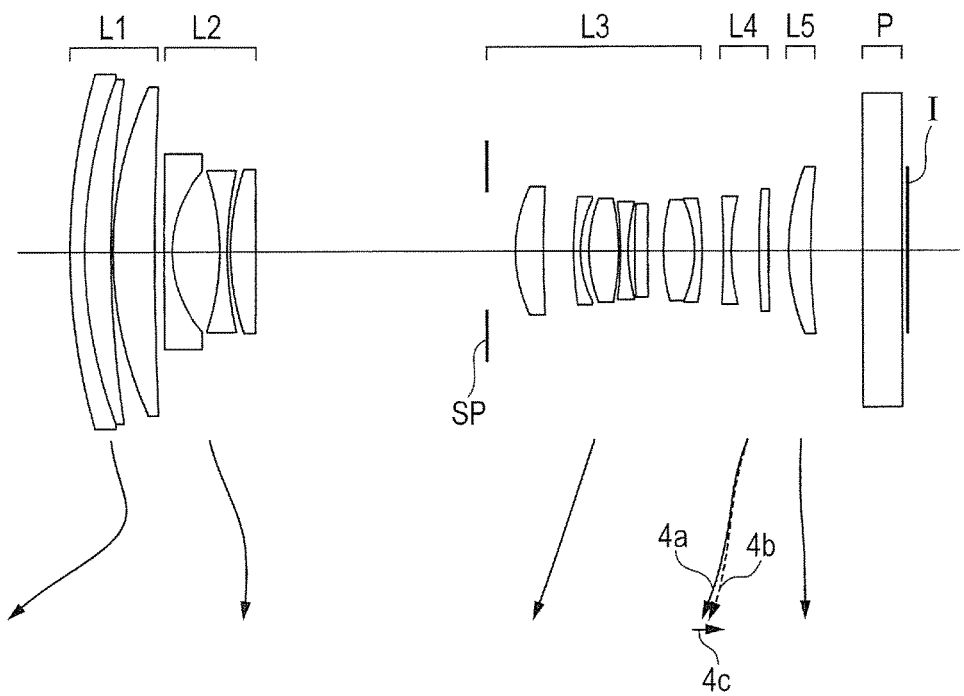
FIG. 11 is a lens cross-sectional view at a wide angle end of a zoom lens according to Embodiment 6 of the present invention.
Figure 12A:
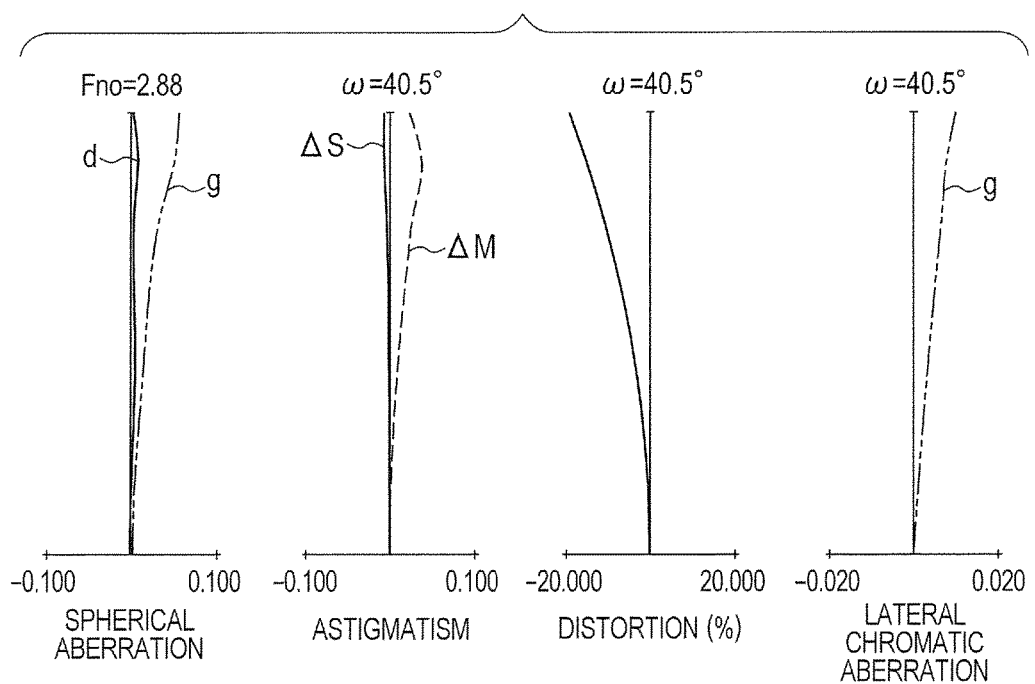
FIG. 12A is a diagram for showing various aberrations at the wide angle end of the zoom lens according to Embodiment 6.

FIG. 11 is a lens cross-sectional view at a wide angle end of a zoom lens according to Embodiment 6 of the present invention. FIGS. 12A, 12B, and 12C are aberration diagrams at the wide angle end, an intermediate zoom position, and a telephoto end, respectively, of the zoom lens of Embodiment 6. The zoom lens of Embodiment 6 has a zoom ratio of 3.80 and F number of from 2.40 to 3.89.

Figure 13:
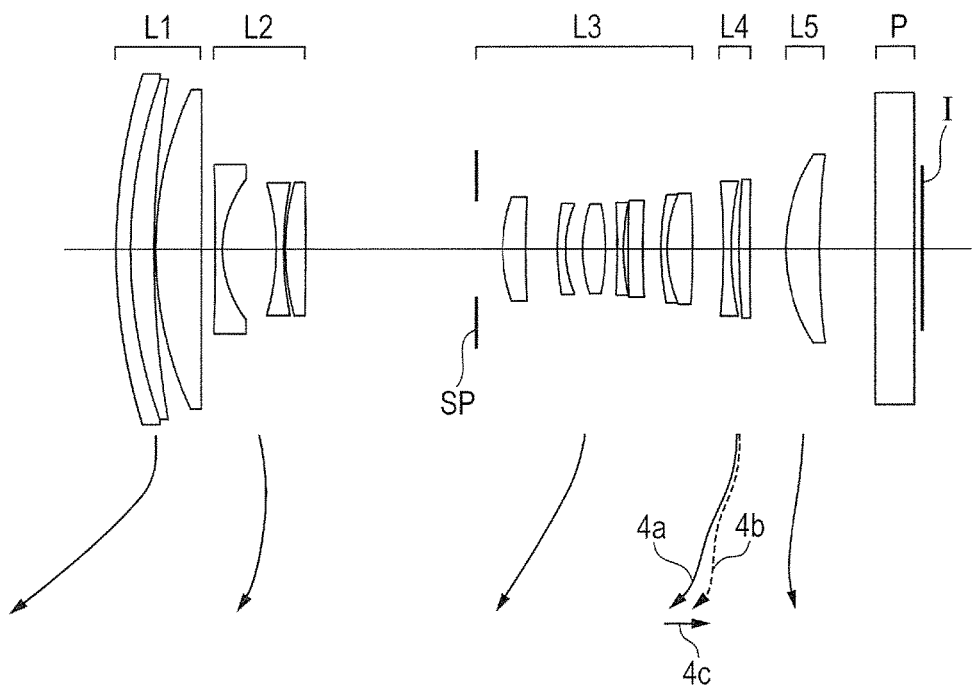
FIG. 13 is a lens cross-sectional view at a wide angle end of a zoom lens according to Embodiment 7 of the present invention.
Figure 14A:
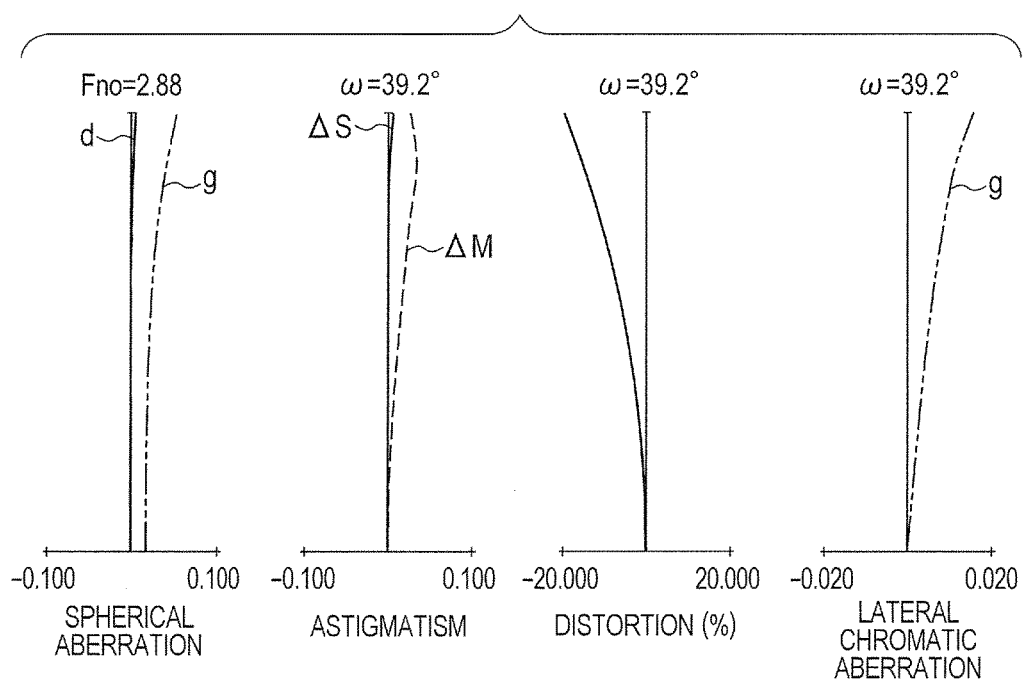
FIG. 14A is a diagram for showing various aberrations at the wide angle end of the zoom lens according to Embodiment 7.
Figure 14B:
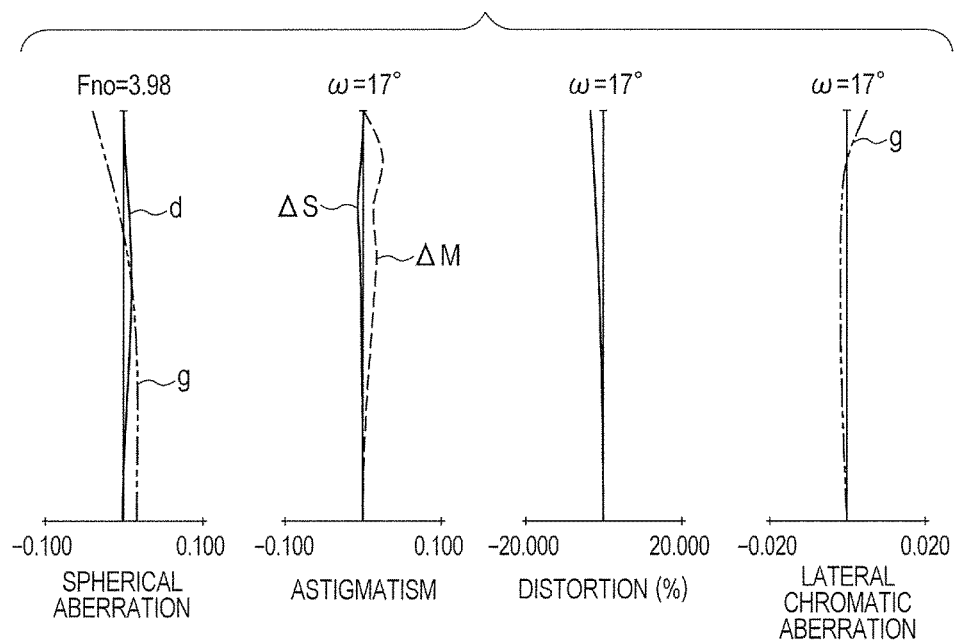
FIG. 14B is a diagram for showing various aberrations at an intermediate zoom position of the zoom lens according to Embodiment 7.
Figure 14C:
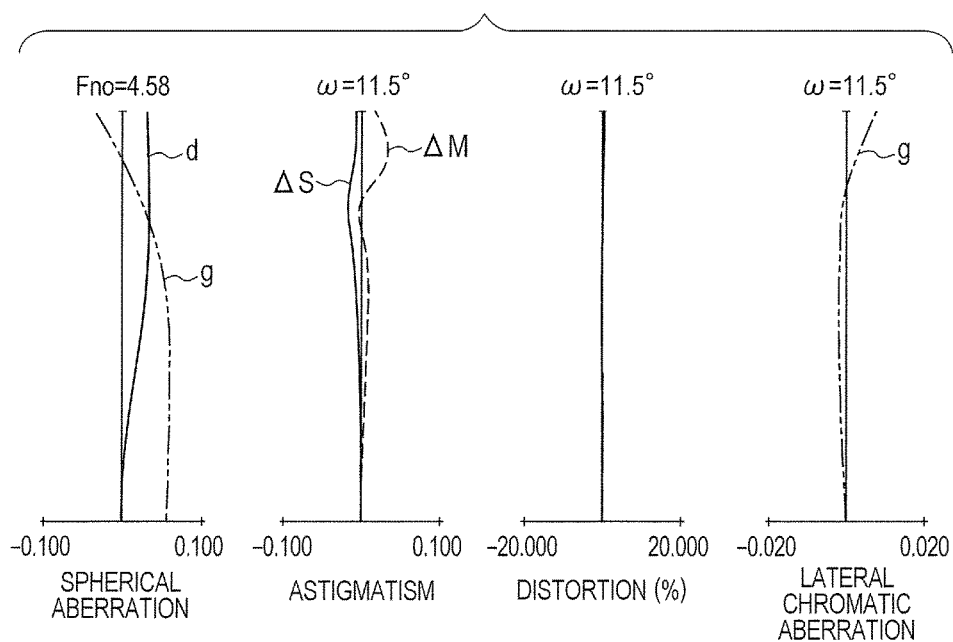
FIG. 14C is a diagram for showing various aberrations at a telephoto end of the zoom lens according to Embodiment 7.

FIG. 13 is a lens cross-sectional view at a wide angle end of a zoom lens according to Embodiment 7 of the present invention. FIGS. 14A, 14B, and 14C are aberration diagrams at the wide angle end, an intermediate zoom position, and a telephoto end, respectively, of the zoom lens of Embodiment 7. The zoom lens of Embodiment 7 has a zoom ratio of 3.80 and F number of from 2.88 to 4.58.

Figure 15:
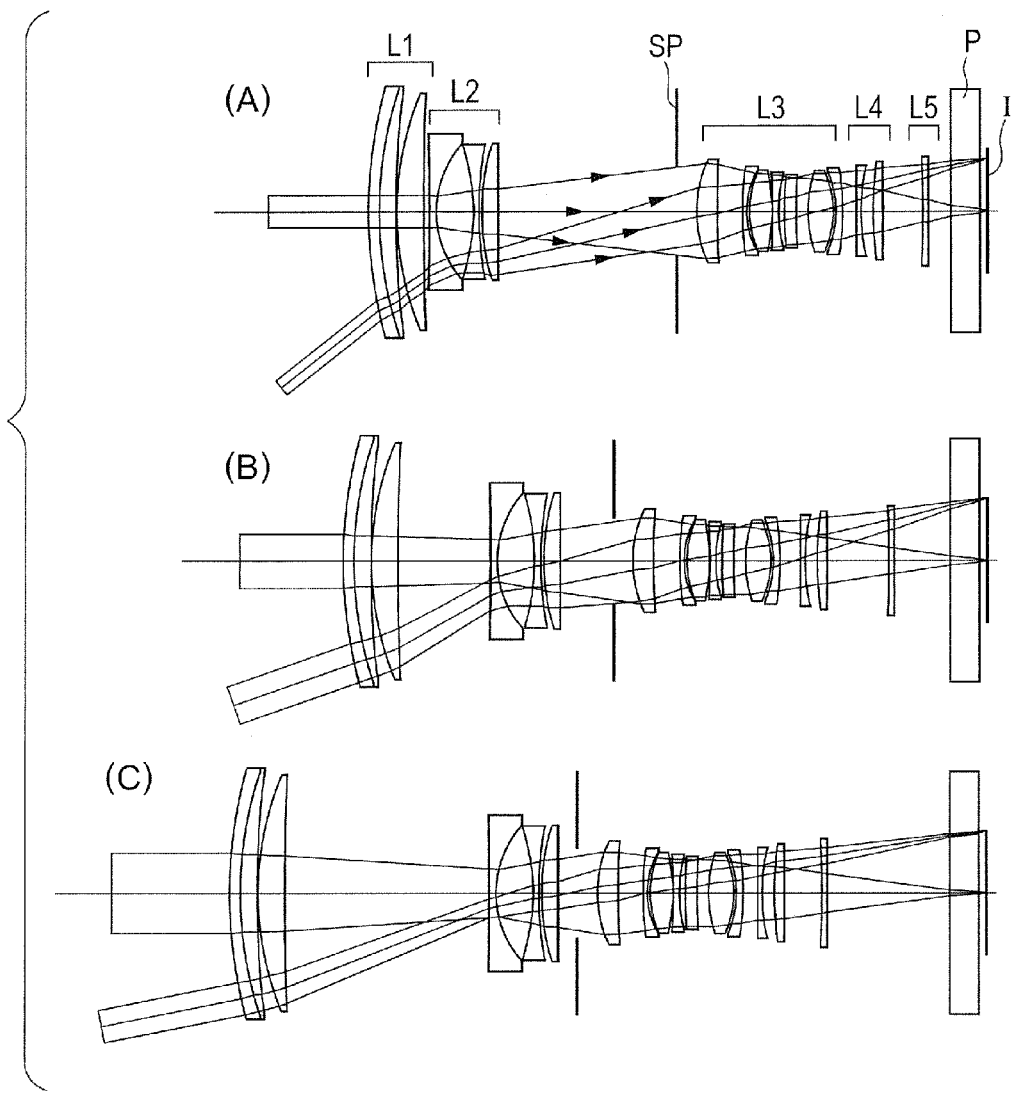
FIG. 15 is an optical path diagram at the wide-angle end (A), the intermediate zoom position (B), and the telephoto end (C) of the zoom lens of Embodiment 3.
Figure 16:
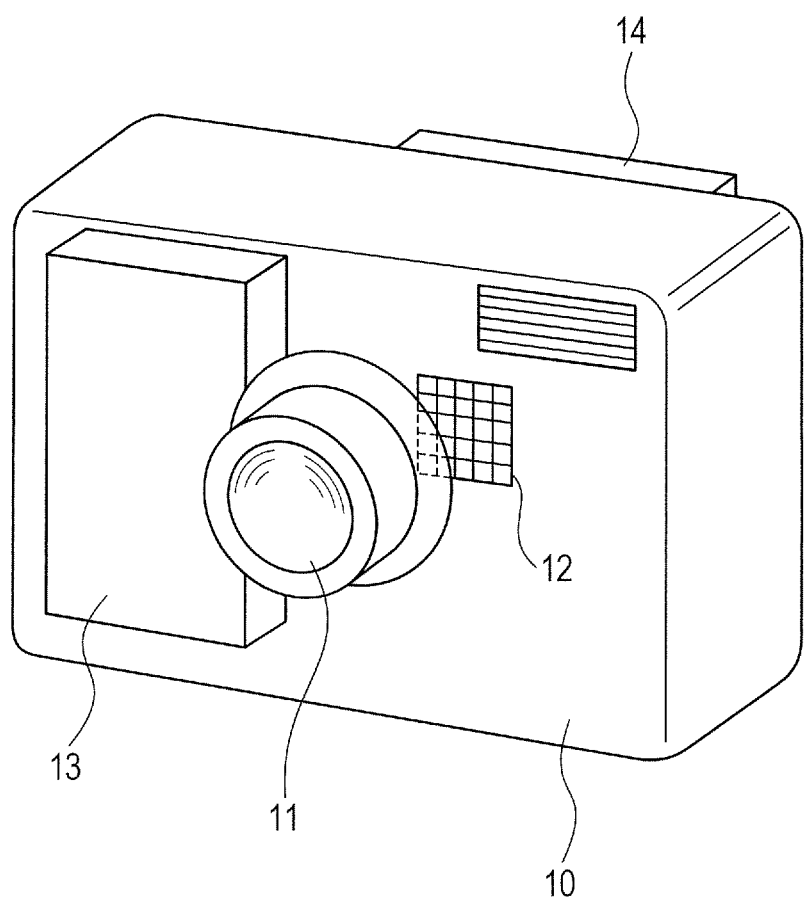
FIG. 16 is a schematic view of a main part as an embodiment of an image pickup apparatus.

FIG. 15 is an optical path diagram at the wide-angle end (A), the intermediate zoom position (B), and the telephoto end (C) of the zoom lens of Embodiment 3. FIG. 16 is a schematic view of a main part of an image pickup apparatus according to the present invention.

The zoom lens in each of Embodiments is an image pickup optical system used with an image pickup apparatus such as a video camera, a digital camera, a monitoring camera, or a TV camera. In the lens cross-sectional views, the left side is a subject side (object side) (front side), and the right side is an image side (rear side). In the lens cross-sectional views, a first lens unit L1 having a positive refractive power (optical power=reciprocal of a focal length), a second lens unit L2 having a negative refractive power, a third lens unit L3 having a positive refractive power, a fourth lens unit L4 having a negative refractive power, and a fifth lens unit L5 having a positive or negative refractive power are illustrated.

In the zoom lens of each of Embodiments 1, 2, and 4 to 7, the refractive power of the fifth lens unit L5 is positive. In the zoom lens of Embodiment 3, the refractive power of the fifth lens unit L5 is negative. In the lens cross-sectional views in respective Embodiments, an aperture stop SP, which determines a ray at an open f-number, is arranged on the object side of the third lens unit L3 or in the third lens unit L3. An optical block P corresponds to an optical filter, a face plate, or the like. An image plane I corresponds to an image pickup surface of a solid-state image pickup element (photoelectric transducer) such as a CCD sensor and a CMOS sensor when the zoom lens is used as an imaging optical system of a video camera or a digital still camera, and corresponds to a film surface when the zoom lens is used as an imaging optical system of a silver-halide film camera.

In the aberration diagrams, an f-number is represented by Fno, and a half angle of view (degrees) is represented by ω. In spherical aberration, a d-line (solid line) is represented by d, and a g-line (dotted line) is represented by g. In astigmatism, a meridional image plane and a sagittal image plane with respect to the d-line are represented by ΔM and ΔS, respectively. In distortion, the d-line is shown. In lateral chromatic aberration, aberration of the g-line with respect to the d-line is shown.

In the lens cross-sectional views, the arrows indicate movement directions of the lens units during zooming from the wide-angle end to the telephoto end and at a time of focusing from an object at infinity to an object at a short distance. Note that, in each of the following Embodiments, the wide-angle end and the telephoto end mean zoom positions when a variable magnification lens unit is located at one end and the other end of a range in which the variable magnification lens unit is mechanically movable on an optical axis, respectively.

In each of Embodiments 1, 2, and 5, as indicated by the arrows, the first lens unit L1 to the fourth lens unit L4 are configured to move during zooming. The fifth lens unit L5 is configured not to move. In each of Embodiments 3, 4, 6, and 7, the first lens unit L1 to the fifth lens unit L5 are configured to move during zooming as indicated by the arrows.

In each of Embodiments 1 to 7, a rear focus type in which the fourth lens unit L4 is moved on the optical axis to perform focusing is adopted. A solid curve 4a and a dotted curve 4b regarding the fourth lens unit L4 are movement loci for correcting an image plane variation accompanying varying magnification when focusing at the object at infinity and the object at the short distance, respectively. Moreover, in a case where focusing is performed from the object at infinity to the object at the short distance at the telephoto end, the focusing is performed by driving the fourth lens unit L4 toward the image side as indicated by the arrow 4c.

The zoom lens according to the present invention includes, in order from the object side to the image side: the first lens unit having a positive refractive power; the second lens unit having a negative refractive power; the third lens unit having a positive refractive power; the fourth lens unit having a negative refractive power; and the fifth lens unit having one of a positive refractive power and a negative refractive power. With such configuration, the downsizing of the zoom lens and a high zoom ratio are attained.

Intervals between the lens units are changed during zooming. During zooming, when the first lens unit L1 is configured not to move, the movements of the second lens unit L2 and the subsequent lens units are disadvantageously restricted. As a result, the positive refractive power of the first lens unit is strengthened, and the varying magnification is mainly performed by the change in interval between the first lens unit L1 and the second lens unit L2. Meanwhile, in a case where the positive refractive power of the first lens unit L1 is strong, it becomes difficult to correct axial chromatic aberration and the spherical aberration at the telephoto end with a small number of constituent lenses.

Therefore, according to the present invention, the first lens unit L1 is moved during zooming to share the positive refractive power with the third lens unit L3 having the same positive refractive power as that of the first lens unit L1. Then, the varying magnification is efficiently performed by both the change in interval between the first lens unit L1 and the second lens unit L2 and the change in interval between the second lens unit L2 and the third lens unit L3. Moreover, in order to downsize the zoom lens, it is effective to strengthen the refractive powers of the lens units as a whole, but the number of constituent lenses is increased for correcting the aberrations. In particular, in a lens unit having a large effective diameter, a size and a mass are increased.

Therefore, according to the present invention, the number of constituent lenses of the third lens unit L3, which has a relatively small lens effective diameter, is four or more to satisfactorily correct various aberrations while suppressing the increases in size and mass. Then, three lenses on the image side in the third lens unit L3 are arranged with air interposed therebetween. In other words, in the third lens unit L3, the lens arranged closest to the image side, the lens arranged second when counted from the image side, and the lens arranged third when counted from the image side are arranged with air gaps therebetween, and the lenses arranged on the image side in the third lens unit L3 correct a curvature of field.

In addition, lenses arranged on the object side in the third lens unit L3 correct the spherical aberration, which has not been satisfactorily corrected. In order to satisfactorily correct the aberrations with a smaller number of constituent lenses, the three lenses from the image side in the third lens unit L3 are arranged with air interposed therebetween to increase the number of lens surfaces for correcting the aberrations. Moreover, the lenses arranged on the object side in the third lens unit L3 tend to increase the spherical aberration due to manufacturing errors, but the air gaps between the three lenses from the image side in the third lens unit L3 are adjusted to facilitate the correction of the spherical aberration.

The two lenses when counted from the image side in the third lens unit L3 are formed of a positive lens and a negative lens in order from the object side to the image side, or formed of a negative lens and a positive lens in order from the object side to the image side. A negative lens is arranged as the first lens or the second lens from the image side in the third lens unit L3, at which a height of incidence of an off-axial ray becomes high, to correct the lateral chromatic aberration. It should be noted, however, that when a lens having a negative refractive power is arranged on the image side in the third lens unit L3, the positive refractive power becomes strong on the object side in the third lens unit L3 to increase the spherical aberration and coma.

Therefore, according to the present invention, the two lenses on the image side in the third lens unit L3 are a positive lens and a negative lens to suppress concentration of the positive refractive power on the object side in the third lens unit L3.

Rays in the optical path diagram of FIG. 15 represent an axial ray and a most off-axial ray when Embodiment 3 is taken as an example. The lines indicating a ray are a beam on the outermost periphery of the ray and a beam at the center of the ray. From FIG. 15, it can be seen that in the zoom lens of the present invention, the axial ray that enters the third lens unit L3 is thick over an entire zoom range, and the lenses on the object side in the third lens unit L3 greatly contribute to the correction of the spherical aberration and the coma.

Therefore, when a lens having a negative refractive power is arranged on the image side in the third lens unit L3 and hence the positive refractive power is strengthened on the object side in the third lens unit L3, it becomes difficult to correct the spherical aberration and the coma. Moreover, as the axial ray and an off-axial ray travel toward the image side from the third lens unit L3, the rays are separated, and heights of incidence of the beams of the off-axial ray are increased, with the result that it can be seen that the contribution on the lateral chromatic aberration is increased.

The zoom lens of the present invention is configured as described above to satisfactorily correct the lateral chromatic aberration while suppressing the arrangement of the negative refractive power in the third lens unit L3 on the image side. Moreover, the second lens and the third lens when counted from the image side in the third lens unit L3 are separated with air interposed therebetween to effectively correct the lateral chromatic aberration.

For the reasons described above, in the zoom lens of the present invention, the third lens unit L3 includes four or more lenses, and the three lenses on the image side in the third lens unit L3 are arranged with the air gaps therebetween. Then, a focal length of the zoom lens at the telephoto end is represented by ft. A movement amount of the first lens unit L1 during zooming from the wide-angle end to the telephoto end is represented by M1, where the sign of the movement amount is negative when the lens unit is located on the object side at the telephoto end with respect to the wide-angle end, and is positive when the lens unit is located on the image side at the telephoto end with respect to the wide-angle end. Then, the following conditional expressions are satisfied:

$$-0.8 < M1/ft < -0.4 \quad (1).$$

Next, the technical meaning of the above-mentioned Conditional Expression is described. Conditional Expression (1) defines a ratio between the focal length of the zoom lens at the telephoto end and the movement amount of the first lens unit L1 during zooming from the wide-angle end to the telephoto end. When the ratio exceeds the upper limit value of Conditional Expression (1), the positive refractive power of the first lens unit L1 becomes strong to maintain the high zoom ratio, and hence it is difficult to correct the axial chromatic aberration and the spherical aberration at the telephoto end. Alternatively, the interval between the second lens unit L2 and the third lens unit L3 is increased, and a position of an entrance pupil is elongated at the wide-angle end, with the result that a front lens effective diameter is increased when an angle of view is widened.

On the contrary, when the ratio falls below the lower limit value, a total lens length (value obtained by adding air-converted back focus to a distance from the first lens surface to the final lens surface) is increased at the telephoto end, which is undesirable. Alternatively, in order to obtain a desired angle of view while reducing the interval between the second lens unit L2 and the third lens unit L3 at the wide-angle end, the negative refractive power of the second lens unit L2 becomes strong with respect to the positive refractive power of the first lens unit L1, and hence it is difficult to correct the curvature of field and the lateral chromatic aberration at the wide-angle end.

In the zoom lens of the present invention, it is more preferred to satisfy at least one of the following Conditional Expressions. A focal length of the second lens unit L2 is represented by f2. A focal length of the third lens unit L3 is represented by f3. A focal length of the fourth lens unit L4 is represented by f4. Curvature radii of a lens surface on the object side of the lens arranged closest to the image side in the third lens unit L3 and a lens surface on the image side of the lens arranged second when counted from the image side in the third lens unit L3 are represented by Ro31 and Ri32, respectively. A focal length of the zoom lens at the wide-angle end is represented by fw.

In this case, it is preferred to satisfy one of the following conditional expressions.

$$-0.08 < (Ro31-Ri32)/(Ro31+Ri32) < 0.05 \quad (2)$$

$$-1.9 < f3/f2 < -1.2 \quad (3)$$

$$1.5 < f3/fw < 2.3 \quad (4)$$

$$-1.5 < f2/fw < -0.9 \quad (5)$$

$$-15.00 < f4/fw < -2.50 \quad (6)$$

Next, the technical meanings of Conditional Expressions (2) to (6) are described.

Conditional Expression (2) defines a shape factor of air (air lens) between the first lens and the second lens from the image side in the third lens unit. In a case where the ratio exceeds the upper limit value of Conditional Expression (2), or falls below the lower limit value, a refractive power of the air lens becomes strong, and hence a change in spherical aberration with the change in air gap between the first lens and the second lens from the image side in the third lens unit L3 becomes large. As a result, it becomes difficult to adjust the spherical aberration that has deteriorated by the manufacturing errors.

Conditional Expression (3) defines a ratio between the focal length of the second lens unit L2 and the focal length of the third lens unit L3. When the ratio exceeds the upper limit of Conditional Expression (3), it becomes difficult to correct mainly the spherical aberration over the entire zoom range. On the contrary, when the ratio falls below the lower limit value, it becomes difficult to correct the astigmatism at the wide-angle end.

Conditional Expression (4) defines a ratio between the focal length of the third lens unit L3 and the focal length of the zoom lens at the wide-angle end. When the ratio exceeds the upper limit value of Conditional Expression (4), a movement amount of the third lens unit L3 becomes large during zooming, and the total lens length is increased. On the contrary, when the ratio falls below the lower limit value, it becomes difficult to satisfactorily correct mainly the spherical aberration over the entire zoom range.

Conditional Expression (5) defines a ratio between the focal length of the second lens unit L2 and the focal length of the zoom lens at the wide-angle end. When the ratio exceeds the upper limit value of Conditional Expression (5), it becomes difficult to correct the astigmatism at the wide-angle end. On the contrary, when the ratio falls below the lower limit value, the interval between the second lens unit L2 and the third lens unit L3 tends to be increased in order to increase a photographing angle of view at the wide-angle end, with the result that the entrance pupil is elongated to increase effective diameters of the first lens unit L1 and the second lens unit L2.

Conditional Expression (6) defines a ratio between the focal length of the fourth lens unit L4 and the focal length of the zoom lens at the wide-angle end. When the ratio exceeds the upper limit value of Conditional Expression (6), the distortion is increased on the telephoto side, and it becomes difficult to correct the aberration. On the contrary, when the ratio falls below the lower limit value, an amount by which the fourth lens unit L4 is moved to correct the image plane variation accompanying the varying magnification is increased to increase the total lens length.

Note that, it is further preferred to set the numerical value ranges of Conditional Expressions (1) to (6) as follows.

$$-0.73 < M1/ft < -0.4 \tag{1a}$$

$$-0.040 < (Ro31 - Ri32)/(Ro31 + Ri32) < 0.045 \tag{2a}$$

$$-1.90 < f3/f2 < -1.24 \tag{3a}$$

$$1.62 < f3/fw < 2.06 \tag{4a}$$

$$-1.38 < f2/fw < -1.00 \tag{5a}$$

$$-14.60 < f4/fw < -2.67 \tag{6a}$$

Moreover, in another zoom lens of the present invention, the second lens unit L2 includes four or less lenses, and the third lens unit L3 includes four or more lenses. Then, of the lens arranged closest to the image side and the lens arranged second when counted from the image side in the third lens unit L3, one is formed of a positive lens, and the other is formed of a negative lens. Then, Conditional Expression (1) and Conditional Expression (3) described above are satisfied:

$$-0.8 < M1/ft < -0.4 \tag{1}$$

$$-1.9 < f3/f2 < -1.2 \tag{3}$$

In still another zoom lens of the present invention, the number of constituent lenses of the third lens unit L3, which has the relatively small lens effective diameter, is four or more, and the second lens unit L2, which tends to have a larger effective diameter than the third lens unit L3, includes four or less lenses. More specifically, the second lens unit L2 includes three or four lenses to satisfactorily correct the various aberrations while suppressing the increases in size and mass. Note that, when the fifth lens unit L5 is configured to have the positive refractive power, the curvature of field is advantageously corrected, which facilitates the configuration in which the number of lenses of the second lens unit L2 is three or four.

The two lenses counted from the image side in the third lens unit L3 are formed of a positive lens and a negative lens in order from the object side to the image side, or of a negative lens and a positive lens in order from the object side to the image side. As the first lens or the second lens from the image side, at which the height of incidence of the off-axial ray is increased in the third lens unit L3, a negative lens is arranged to correct the lateral chromatic aberration. It should be noted, however, that when a lens having a negative refractive power is arranged on the image side in the third lens unit L3, the positive refractive power becomes strong on the object side in the third lens unit L3 to increase the spherical aberration and the coma.

Therefore, in yet another zoom lens of the present invention, of the lens arranged closest to the image side and the lens arranged second when counted from the image side in the third lens unit L3, one is a positive lens, and the other is a negative lens to suppress the concentration of the positive refractive power on the object side in the third lens unit L3.

In yet another zoom lens of the present invention, it is further preferred to satisfy at least one of the following Conditional Expressions.

$$-0.08 < (Ro31 - Ri32)/(Ro31 + Ri32) < 0.05 \tag{2}$$

$$1.5 < f3/fw < 2.3 \tag{4}$$

$$-1.5 < f2/fw < -0.9 \tag{5}$$

$$-15.00 < f4/fw < -2.50 \tag{6}$$

Note that, it is further preferred to set the numerical value ranges of Conditional Expressions (1) to (6) as follows.

$$-0.73 < M1/ft < -0.4 \tag{1a}$$

$$-0.040 < (Ro31 - Ri32)/(Ro31 + Ri32) < 0.045 \tag{2a}$$

$$-1.90 < f3/f2 < -1.24 \tag{3a}$$

$$1.62 < f3/fw < 2.06 \tag{4a}$$

$$-1.38 < f2/fw < -1.00 \tag{5a}$$

$$-14.60 < f4/fw < -2.67 \tag{6a}$$

In the zoom lens of the present invention, it is desired that each of the fourth lens unit L4 and the fifth lens unit L5 include two or less lenses. The lens unit on the image side of the fourth lens unit L4 tends to have a larger effective diameter than that of the third lens unit L3, with the result that the number of constituent lenses is increased to increase a mass. Moreover, the fourth lens unit L4 and the fifth lens unit L5 make a smaller contribution to an aberration variation during zooming than that of the second lens unit L2. Therefore, it becomes easy to satisfactorily correct the aberrations even with two or less lenses. Moreover, in the zoom lens of the present invention, it is desired that the first lens unit L1 include four or less lenses.

The first lens unit L1 is important in correcting the various aberrations, but is a lens unit having the largest effective diameter. Therefore, unless even the number of bright lenses is suppressed to four or less, it becomes difficult to downsize the zoom lens. Moreover, in the zoom lens of the present invention, it is desired to move the lens arranged closest to the image side and the lens arranged second when counted from the image side in the third lens unit L3 in a direction having a component in a direction perpendicular to the optical axis to perform camera shake correction (image stabilization).

In order to obtain a photographing result of high image quality even when the camera is held by hand, it is desired to perform the camera shake correction. However, with a camera including a large image pickup element, the entire lens system also becomes large, and a lens for correcting the camera shake becomes disadvantageously heavy. The effective diameter of the third lens unit L3 tends to become small, and the two lenses on the image side in the third lens unit L3 are formed of a positive lens and a negative lens. Therefore, the smallest number of lenses in a configuration capable of suppressing a change in lateral chromatic aberration due to decentering during the camera shake correction is used. Moreover, in the zoom lens of the present invention, the fourth lens unit L4 is configured to move during focusing.

In the zoom lens of the present invention, a lens unit configured to move only for focusing is not provided, but is shared with a lens unit configured to correct an image plane movement during the varying magnification to simplify the mechanism. Moreover, it is more preferred that a change in photographing angle of view be smaller during focusing, and in the zoom lens of the present invention, it is preferred to perform focusing by a lens unit arranged on the image side of the third lens unit L3, which has a small magnification varying action. When a reduction in weight of the focus lens unit is also taken into consideration, the effective diameter is easily reduced when the focus lens unit is near the third lens unit L3, so that it is desired to perform focusing by the fourth lens unit L4.

Moreover, due to the manufacturing errors, the spherical aberration of the lenses arranged on the object side in the third lens unit L3 is increased, and in the case where the air gaps between the three lenses from the image side in the third lens unit L3 are adjusted to correct the spherical aberration, a focal position is changed. Therefore, the focal position is adjusted with the fourth lens unit L4, which has a small effect on the spherical aberration, with the result that the spherical aberration is maintained satisfactorily even after the focal position adjustment.

Next, an embodiment of a digital still camera in which the zoom lens according to the present invention is used as a photographing optical system is described with reference to FIG. 16. In FIG. 16, the digital still camera includes a camera main body 10 and a photographing optical system 11 including the zoom lens described in any one of Embodiments 1 to 4. A solid-state image pickup element (photoelectric transducer) 12, such as a CCD sensor or a CMOS sensor, is included in the camera main body to receive a subject image formed by the photographing optical system 11.

A memory 13 records information corresponding to a subject image that has been photoelectrically converted by the solid-state image pickup element 12. A viewfinder 14 is formed of a liquid crystal display panel or the like, and is used to observe the subject image formed on the solid-state image pickup element 12.

The present invention may be equally applied to the video camera (image pickup apparatus) using the zoom lens of the present invention as the image pickup optical system. By applying the zoom lens of the present invention to the image pickup apparatus such as the digital still camera or the video camera in such a manner, the compact image pickup apparatus having the high optical performance can be realized. Note that, if an electronic image pickup element such as a CCD is used as the image pickup element, the aberration is electronically corrected, to thereby enable the image quality of the output image to be more enhanced.

Next, Numerical Embodiments corresponding respectively to Embodiments of the present invention are described. In each Numerical Embodiment, symbol i indicates the order of an optical plane from the object side. Symbol ri represents a curvature radius of the i-th optical plane; di, an i-th plane interval; and ndi and vdi, a refractive index and an Abbe constant of a material of an i-th optical member with respect to the d-line, respectively. Back focus (BF) is an air-converted distance between a final lens surface and a paraxial image plane. The total lens length is a value obtained by adding the back focus (BF) to a distance between a first lens surface and the final lens surface.

In Numerical Embodiments, the last two surfaces are surfaces of the optical block such as the filter or the face plate. In addition, symbol K represents an eccentricity, symbols A4, A6, and A8 represent aspherical coefficients, and a displacement in the optical axis direction at a position of height H from the optical axis with respect to a surface apex is represented by symbol x. Then, an aspherical shape is expressed by the following expression.

$$X = \frac{(1/R)H^2}{1+\sqrt{1-(1+K)(H/R)^2}} + A4H^4 + A6H^6 + A8H^8$$

Numerical Embodiment 1

Unit mm
Surface data

| Surface number | r | d | nd | vd |
|---|---|---|---|---|
| 1 | 60.515 | 1.40 | 1.90366 | 31.3 |
| 2 | 33.620 | 4.81 | 1.59522 | 67.7 |
| 3 | 213.334 | 0.17 | | |
| 4 | 39.550 | 3.95 | 1.59522 | 67.7 |
| 5 | 344.053 | (Variable) | | |
| 6 | 428.645 | 0.80 | 1.88300 | 40.8 |
| 7 | 9.873 | 4.70 | | |
| 8 | −27.499 | 0.70 | 1.62299 | 58.2 |
| 9 | 37.697 | 0.39 | | |
| 10 | 19.346 | 2.11 | 1.95906 | 17.5 |
| 11 | 91.549 | 0.65 | 1.83481 | 42.7 |
| 12 | 42.465 | (Variable) | | |
| 13* | 9.580 | 2.37 | 1.69350 | 53.2 |
| 14* | 493.816 | 1.49 | | |
| 15 | 27.070 | 0.70 | 1.85478 | 24.8 |
| 16 | 8.227 | 0.55 | | |
| 17 | 14.036 | 1.17 | 1.91082 | 35.3 |
| 18 | 31.141 | 2.86 | | |
| 19 (Aperture Stop) | ∞ | 5.99 | | |
| 20* | 21.347 | 2.70 | 1.58313 | 59.4 |
| 21 | −13.971 | 0.20 | | |
| 22 | −14.044 | 0.60 | 1.69895 | 30.1 |

-continued

Numerical Embodiment 1

| | | | | |
|---|---|---|---|---|
| 23 | −43.495 | (Variable) | | |
| 24 | −27.858 | 0.60 | 1.49700 | 81.5 |
| 25 | 67.925 | (Variable) | | |
| 26 | 15.819 | 3.66 | 1.49700 | 81.5 |
| 27 | 112.668 | 3.09 | | |
| 28 | ∞ | 2.39 | 1.51633 | 64.1 |
| 29 | ∞ | 1.00 | | |
| Image plane | ∞ | | | |

Aspherical surface data

Thirteenth surface
K = −3.80870e−001    A4 = −1.93618e−005
Fourteenth surface
K = 3.79865e+003    A4 = 7.61748e−006
Twentieth surface
K = −4.63980e+000    A4 = 3.70395e−005

Various data
Zoom ratio 9.64

| | Wide angle | Intermediate | Telephoto |
|---|---|---|---|
| Focal length | 9.17 | 35.39 | 88.38 |
| F-number | 2.88 | 4.95 | 5.77 |
| Half angle of view (degrees) | 41.5 | 12.6 | 5.05 |
| Image height | 6.68 | 8.00 | 8.00 |
| Total lens length | 76.89 | 97.29 | 113.20 |
| BF | 5.66 | 5.66 | 5.66 |
| d5 | 0.65 | 18.71 | 33.11 |
| d12 | 20.00 | 5.24 | 0.32 |
| d23 | 4.57 | 11.69 | 11.79 |
| d25 | 3.43 | 13.41 | 19.73 |

Zoom lens unit data

| Unit | First surface | Focal length |
|---|---|---|
| 1 | 1 | 61.90 |
| 2 | 6 | −9.80 |
| 3 | 13 | 18.01 |
| 4 | 24 | −39.67 |
| 5 | 26 | 36.57 |
| 6 | 28 | ∞ |

Numerical Embodiment 2

Unit mm
Surface data

| Surface number | r | d | nd | vd |
|---|---|---|---|---|
| 1 | 57.406 | 1.38 | 1.90366 | 31.3 |
| 2 | 34.849 | 4.71 | 1.49700 | 81.5 |
| 3 | 337.524 | 0.17 | | |
| 4 | 38.962 | 3.96 | 1.59522 | 67.7 |
| 5 | 347.617 | (Variable) | | |
| 6 | 25,449.906 | 0.79 | 1.83481 | 42.7 |
| 7 | 9.857 | 4.70 | | |
| 8 | −25.748 | 0.60 | 1.59522 | 67.7 |
| 9 | 27.610 | 0.17 | | |
| 10 | 18.412 | 1.80 | 1.95906 | 17.5 |
| 11 | 52.779 | (Variable) | | |
| 12* | 13.033 | 1.96 | 1.76802 | 49.2 |
| 13* | −602.983 | 0.42 | | |
| 14 | 8.828 | 2.16 | 1.49700 | 81.5 |
| 15 | 39.399 | 0.72 | 1.69895 | 30.1 |
| 16 | 7.024 | 3.38 | | |
| 17 (Aperture Stop) | ∞ | 5.44 | | |
| 18* | 19.947 | 2.55 | 1.58313 | 59.4 |
| 19 | −14.028 | 0.17 | | |
| 20 | −13.916 | 0.60 | 2.00100 | 29.1 |
| 21 | −24.185 | (Variable) | | |

-continued

Numerical Embodiment 2

| | | | | |
|---|---|---|---|---|
| 22 | −25.187 | 0.61 | 1.49700 | 81.5 |
| 23 | 153.490 | (Variable) | | |
| 24 | 16.153 | 3.56 | 1.49700 | 81.5 |
| 25 | 127.840 | 2.60 | | |
| 26 | ∞ | 2.93 | 1.51633 | 64.1 |
| 27 | ∞ | 1.00 | | |
| Image plane | ∞ | | | |

Aspherical surface data

Twelfth surface
K = −8.50368e−001    A4 = 1.36385e−005
Thirteenth surface
K = −1.00382e+004    A4 = 4.51561e−006
Eighteenth surface
K = −3.72187e+000    A4 = 4.33347e−005

Various data
Zoom ratio 9.56

| | Wide angle | Intermediate | Telephoto |
|---|---|---|---|
| Focal length | 9.47 | 36.56 | 90.54 |
| F-number | 2.88 | 4.86 | 5.77 |
| Half angle of view (degrees) | 40.5 | 12.2 | 4.94 |
| Image height | 6.72 | 8.00 | 8.00 |
| Total lens length | 74.29 | 95.50 | 110.83 |
| BF | 5.53 | 5.53 | 5.53 |
| d5 | 0.88 | 19.91 | 33.41 |
| d11 | 19.84 | 5.65 | 0.35 |
| d21 | 4.48 | 10.71 | 11.23 |
| d23 | 3.71 | 13.87 | 20.47 |

Zoom lens unit data

| Unit | First surface | Focal length |
|---|---|---|
| 1 | 1 | 62.23 |
| 2 | 6 | −10.05 |
| 3 | 12 | 17.77 |
| 4 | 22 | −43.49 |
| 5 | 24 | 36.81 |
| 6 | 26 | ∞ |

Numerical Embodiment 3

Unit mm
Surface data

| Surface number | r | d | nd | vd |
|---|---|---|---|---|
| 1 | 61.699 | 1.29 | 2.00069 | 25.5 |
| 2 | 48.638 | 2.22 | 1.49700 | 81.5 |
| 3 | 115.615 | 0.17 | | |
| 4 | 39.550 | 3.44 | 1.49700 | 81.5 |
| 5 | 345.681 | (Variable) | | |
| 6 | −530.324 | 0.80 | 2.00330 | 28.3 |
| 7 | 12.541 | 4.90 | | |
| 8 | −28.125 | 0.68 | 1.53775 | 74.7 |
| 9 | 41.668 | 0.29 | | |
| 10 | 25.897 | 2.27 | 1.95906 | 17.5 |
| 11 | −1,354.956 | (Variable) | | |
| 12 (Aperture Stop) | ∞ | 2.55 | | |
| 13 | 14.421 | 2.60 | 1.88300 | 40.8 |
| 14* | 124.769 | 3.35 | | |
| 15 | 37.704 | 0.60 | 1.84666 | 23.8 |
| 16 | 10.974 | 0.30 | | |
| 17 | 13.112 | 2.88 | 1.56907 | 71.3 |
| 18 | −24.623 | 0.17 | | |
| 19 | −56.698 | 0.75 | 1.54814 | 45.8 |
| 20 | 17.421 | 0.81 | | |
| 21* | 73.621 | 1.49 | 1.88300 | 40.8 |
| 22 | 71.695 | 1.51 | | |

-continued

Numerical Embodiment 3

| | | | | |
|---|---|---|---|---|
| 23 | 16.259 | 3.32 | 1.56907 | 71.3 |
| 24 | −12.559 | 0.34 | | |
| 25 | −11.758 | 0.75 | 1.78590 | 44.2 |
| 26 | −29.598 | (Variable) | | |
| 27 | 679.067 | 0.60 | 1.75700 | 47.8 |
| 28 | 21.577 | 1.59 | | |
| 29 | 46.498 | 1.37 | 1.90366 | 31.3 |
| 30 | −141.491 | (Variable) | | |
| 31 | −174.010 | 0.58 | 1.69895 | 30.1 |
| 32 | 711.809 | (Variable) | | |
| 33 | ∞ | 3.80 | 1.51633 | 64.1 |
| 34 | ∞ | 1.00 | | |
| Image plane | ∞ | | | |

Aspherical surface data

Thirteenth surface
K = 3.97031e−001   A4 = −2.96707e−005
A6 = 7.00951e−008   A8 = −2.29304e−009

Fourteenth surface
K = 1.63357e+001   A4 = 2.62704e−005
A6 = 2.77825e−007   A8 = −2.52376e−009

Twenty-first surface
K = −7.55889e+001   A4 = 2.32380e−006
A6 = 2.61899e−007   A8 = −6.88004e−009

Various data
Zoom ratio 3.80

| | Wide angle | Intermediate | Telephoto |
|---|---|---|---|
| Focal length | 10.31 | 22.74 | 39.16 |
| F-number | 2.40 | 3.33 | 3.84 |
| Half angle of view (degrees) | 38.9 | 19.8 | 11.5 |
| Image height | 6.80 | 8.00 | 8.00 |
| Total lens length | 79.06 | 82.15 | 96.51 |
| BF | 6.52 | 10.89 | 19.45 |
| d5 | 0.85 | 12.05 | 26.34 |
| d11 | 23.17 | 7.01 | 2.53 |
| d26 | 1.82 | 2.64 | 1.82 |
| d30 | 5.08 | 7.94 | 4.74 |
| d32 | 3.01 | 7.39 | 15.95 |

Zoom lens unit data

| Unit | First surface | Focal length |
|---|---|---|
| 1 | 1 | 78.66 |
| 2 | 6 | −14.03 |
| 3 | 12 | 17.96 |
| 4 | 27 | −149.42 |
| 5 | 31 | −200.00 |
| 6 | 33 | ∞ |

Numerical Embodiment 4

Unit mm
Surface data

| Surface number | r | d | nd | vd |
|---|---|---|---|---|
| 1 | 58.520 | 1.38 | 1.95906 | 17.5 |
| 2 | 49.486 | 2.26 | 1.49700 | 81.5 |
| 3 | 106.201 | 0.17 | | |
| 4 | 40.287 | 4.14 | 1.45600 | 90.3 |
| 5 | −2,204.520 | (Variable) | | |
| 6 | −385.783 | 0.72 | 1.95375 | 32.3 |
| 7 | 11.428 | 5.05 | | |
| 8 | −24.555 | 0.62 | 1.59282 | 68.6 |
| 9 | 33.755 | 0.18 | | |
| 10 | 24.025 | 2.00 | 1.95906 | 17.5 |
| 11 | 1,298.567 | (Variable) | | |
| 12 (Aperture Stop) | ∞ | 2.55 | | |

-continued

Numerical Embodiment 4

| | | | | |
|---|---|---|---|---|
| 13* | 14.471 | 2.28 | 1.88300 | 40.8 |
| 14* | 168.057 | 2.98 | | |
| 15 | 25.340 | 0.75 | 1.92286 | 20.9 |
| 16 | 11.049 | 0.63 | | |
| 17 | 14.154 | 2.21 | 1.56907 | 71.3 |
| 18 | −20.386 | 0.28 | | |
| 19 | −71.292 | 0.75 | 1.54814 | 45.8 |
| 20 | 22.603 | 1.00 | | |
| 21* | 101.998 | 1.47 | 1.74100 | 52.6 |
| 22 | 83.394 | 1.97 | | |
| 23 | 25.039 | 0.75 | 1.72000 | 50.2 |
| 24 | 13.723 | 1.43 | | |
| 25 | 14.865 | 2.30 | 1.59282 | 68.6 |
| 26 | −140.605 | (Variable) | | |
| 27 | −51.718 | 0.75 | 1.60323 | 42.5 |
| 28 | 30.730 | 0.52 | | |
| 29 | 76.990 | 0.98 | 2.00100 | 29.1 |
| 30 | 239.026 | (Variable) | | |
| 31 | 15.854 | 3.45 | 1.49700 | 81.5 |
| 32 | 64.949 | (Variable) | | |
| 33 | ∞ | 3.80 | 1.51633 | 64.1 |
| 34 | ∞ | 1.00 | | |
| Image plane | ∞ | | | |

Aspherical surface data

Thirteenth surface
K = −4.49467e−001   A4 = 6.36803e−006
A6 = −9.68889e−008   A8 = −5.42751e−009

Fourteenth surface
K = 4.92473e+002   A4 = 3.10116e−005
A6 = −3.11498e−007   A8 = −8.48583e−009

Twenty-first surface
K = 2.38764e+000   A4 = −3.00330e−005
A6 = 2.04655e−007   A8 = −8.87921e−009

Various data
Zoom ratio 3.80

| | Wide angle | Intermediate | Telephoto |
|---|---|---|---|
| Focal length | 10.19 | 29.64 | 38.73 |
| F-number | 2.88 | 4.35 | 4.86 |
| Half angle of view (degrees) | 39.6 | 15.5 | 11.7 |
| Image height | 6.80 | 8.00 | 8.00 |
| Total lens length | 77.00 | 94.15 | 101.38 |
| BF | 7.83 | 9.46 | 8.63 |
| d5 | 1.50 | 18.66 | 23.15 |
| d11 | 18.41 | 4.78 | 3.24 |
| d26 | 2.85 | 8.27 | 8.82 |
| d30 | 2.83 | 9.40 | 13.96 |
| d32 | 4.33 | 5.96 | 5.12 |

Zoom lens unit data

| Unit | First surface | Focal length |
|---|---|---|
| 1 | 1 | 72.26 |
| 2 | 6 | −11.41 |
| 3 | 12 | 18.07 |
| 4 | 27 | −44.58 |
| 5 | 31 | 41.24 |
| 6 | 33 | ∞ |

Numerical Embodiment 5

Unit mm
Surface data

| Surface number | r | d | nd | vd |
|---|---|---|---|---|
| 1 | 57.391 | 1.38 | 1.90366 | 31.3 |
| 2 | 34.868 | 4.72 | 1.49700 | 81.5 |

Numerical Embodiment 5

| 3 | 338.436 | 0.17 | | |
| 4 | 38.971 | 3.96 | 1.59522 | 67.7 |
| 5 | 346.082 | (Variable) | | |
| 6 | 5,606.902 | 0.79 | 1.83481 | 42.7 |
| 7 | 9.859 | 4.71 | | |
| 8 | −25.716 | 0.60 | 1.59522 | 67.7 |
| 9 | 27.539 | 0.17 | | |
| 10 | 18.412 | 1.80 | 1.95906 | 17.5 |
| 11 | 52.663 | (Variable) | | |
| 12* | 12.985 | 1.96 | 1.76802 | 49.2 |
| 13* | −555.243 | 0.43 | | |
| 14 | 8.824 | 2.16 | 1.49700 | 81.5 |
| 15 | 39.535 | 0.75 | 1.69895 | 30.1 |
| 16 | 7.000 | 3.37 | | |
| 17 (Aperture Stop) | ∞ | 0.00 | | |
| 18 | ∞ | 5.50 | | |
| 19* | 19.968 | 2.56 | 1.58313 | 59.4 |
| 20 | −13.966 | 0.60 | 2.00100 | 29.1 |
| 21 | −24.109 | (Variable) | | |
| 22 | −25.072 | 0.60 | 1.49700 | 81.5 |
| 23 | 152.545 | (Variable) | | |
| 24 | 16.123 | 3.54 | 1.49700 | 81.5 |
| 25 | 120.207 | 2.64 | | |
| 26 | ∞ | 2.93 | 1.51633 | 64.1 |
| 27 | ∞ | 1.00 | | |
| Image plane | ∞ | | | |

Aspherical surface data

Twelfth surface
K = −8.45227e−001    A4 = 1.39440e−005
Thirteenth surface
K = −8.68505e+003    A4 = 4.10606e−006
Nineteenth surface
K = −3.85528e+000    A4 = 4.55958e−005

Various data
Zoom ratio 9.55

| | Wide angle | Intermediate | Telephoto |
|---|---|---|---|
| Focal length | 9.47 | 36.55 | 90.38 |
| F-number | 2.88 | 4.86 | 5.77 |
| Half angle of view (degrees) | 40.5 | 12.2 | 4.94 |
| Image height | 6.72 | 8.00 | 8.00 |
| Total lens length | 74.30 | 95.52 | 110.92 |
| BF | 5.57 | 5.57 | 5.57 |
| d5 | 0.87 | 19.89 | 33.37 |
| d11 | 19.84 | 5.60 | 0.34 |
| d21 | 4.54 | 10.71 | 11.13 |
| d23 | 3.71 | 13.97 | 20.74 |

Zoom lens unit data

| Unit | First surface | Focal length |
|---|---|---|
| 1 | 1 | 62.22 |
| 2 | 6 | −10.05 |
| 3 | 12 | 17.83 |
| 4 | 22 | −43.28 |
| 5 | 24 | 37.05 |
| 6 | 26 | ∞ |

Numerical Embodiment 6

Unit mm
Surface data

| Surface number | r | d | nd | vd |
|---|---|---|---|---|
| 1 | 62.193 | 1.40 | 2.00069 | 25.5 |
| 2 | 47.392 | 2.52 | 1.49700 | 81.5 |
| 3 | 109.856 | 0.17 | | |
| 4 | 38.294 | 4.00 | 1.49700 | 81.5 |
| 5 | 331.033 | (Variable) | | |
| 6 | 631.611 | 0.79 | 2.00330 | 28.3 |
| 7 | 11.601 | 4.61 | | |
| 8 | −24.385 | 0.71 | 1.53775 | 74.7 |
| 9 | 34.914 | 0.31 | | |
| 10 | 24.629 | 2.42 | 1.95906 | 17.5 |
| 11 | −963.250 | (Variable) | | |
| 12 (Aperture Stop) | ∞ | 2.72 | | |
| 13* | 14.084 | 2.69 | 1.88300 | 40.8 |
| 14* | 141.550 | 2.89 | | |
| 15 | 35.983 | 0.63 | 1.84666 | 23.8 |
| 16 | 11.001 | 0.81 | | |
| 17 | 13.593 | 2.85 | 1.56907 | 71.3 |
| 18 | −23.624 | 0.18 | | |
| 19 | −40.946 | 0.75 | 1.54814 | 45.8 |
| 20 | 18.323 | 0.61 | | |
| 21* | 69.056 | 1.24 | 1.88300 | 40.8 |
| 22 | 202.744 | 1.51 | | |
| 23 | 18.844 | 2.99 | 1.56907 | 71.3 |
| 24 | −11.886 | 0.74 | 1.74400 | 44.8 |
| 25 | −28.652 | (Variable) | | |
| 26 | −104.517 | 0.75 | 1.74400 | 44.8 |
| 27 | 20.890 | 2.67 | | |
| 28 | 87.830 | 0.88 | 1.95906 | 17.5 |
| 29 | 180.104 | (Variable) | | |
| 30 | 21.402 | 2.13 | 1.59282 | 68.6 |
| 31 | 69.451 | (Variable) | | |
| 32 | ∞ | 3.80 | 1.51633 | 64.1 |
| 33 | ∞ | 1.00 | | |
| Image plane | ∞ | | | |

Aspherical surface data

Thirteenth surface
K = 2.53248e−001    A4 = −2.53982e−005
A6 = −1.06214e−007    A8 = −3.09056e−009
Fourteenth surface
K = 2.10348e+002    A4 = 1.67348e−005
A6 = −8.65891e−008    A8 = −3.32223e−009
Twenty-first surface
K = −6.39018e+001    A4 = −8.25182e−006
A6 = 3.65207e−008    A8 = −7.72772e−009

Various data
Zoom ratio 3.80

| | Wide angle | Intermediate | Telephoto |
|---|---|---|---|
| Focal length | 9.72 | 18.49 | 36.92 |
| F-number | 2.40 | 3.23 | 3.89 |
| Half angle of view (degrees) | 40.8 | 24.3 | 12.0 |
| Image height | 6.80 | 8.00 | 8.00 |
| Total lens length | 79.56 | 79.60 | 98.94 |
| BF | 8.49 | 7.51 | 7.80 |
| d5 | 0.89 | 7.78 | 26.98 |
| d11 | 22.20 | 8.69 | 3.27 |
| d25 | 2.01 | 4.93 | 5.65 |
| d29 | 2.00 | 6.70 | 11.28 |
| d31 | 4.98 | 4.00 | 4.29 |

Zoom lens unit data

| Unit | First surface | Focal length |
|---|---|---|
| 1 | 1 | 80.36 |
| 2 | 6 | −12.78 |
| 3 | 12 | 16.61 |
| 4 | 26 | −27.27 |
| 5 | 30 | 51.34 |
| 6 | 32 | ∞ |

Numerical Embodiment 7

Unit mm
Surface data

| Surface number | r | d | nd | vd |
|---|---|---|---|---|
| 1 | 57.507 | 1.39 | 1.95906 | 17.5 |
| 2 | 48.745 | 2.25 | 1.49700 | 81.5 |
| 3 | 100.054 | 0.17 | | |
| 4 | 36.804 | 4.41 | 1.45600 | 90.3 |
| 5 | 60,665.398 | (Variable) | | |
| 6 | −273.625 | 0.69 | 1.95375 | 32.3 |
| 7 | 11.228 | 5.20 | | |
| 8 | −22.616 | 0.69 | 1.59282 | 68.6 |
| 9 | 32.413 | 0.18 | | |
| 10 | 24.039 | 1.93 | 1.95906 | 17.5 |
| 11 | −1,004.470 | (Variable) | | |
| 12 (Aperture Stop) | ∞ | 2.55 | | |
| 13* | 14.613 | 2.26 | 1.88300 | 40.8 |
| 14* | 160.938 | 3.06 | | |
| 15 | 25.798 | 0.75 | 1.92286 | 20.9 |
| 16 | 10.948 | 1.67 | | |
| 17 | 14.455 | 2.21 | 1.56907 | 71.3 |
| 18 | −21.884 | 1.13 | | |
| 19 | −66.695 | 0.60 | 1.54814 | 45.8 |
| 20 | 22.552 | 0.45 | | |
| 21* | 115.159 | 1.41 | 1.74100 | 52.6 |
| 22 | 76.806 | 1.75 | | |
| 23 | 26.058 | 0.60 | 1.72000 | 50.2 |
| 24 | 13.919 | 2.46 | 1.59282 | 68.6 |
| 25 | −98.855 | (Variable) | | |
| 26 | −73.670 | 0.74 | 1.60323 | 42.5 |
| 27 | 31.284 | 0.77 | | |
| 28 | 72.974 | 1.05 | 2.00100 | 29.1 |
| 29 | 372.494 | (Variable) | | |
| 30 | 16.692 | 3.28 | 1.49700 | 81.5 |
| 31 | 78.357 | (Variable) | | |

-continued

Numerical Embodiment 7

| 32 | ∞ | 3.80 | 1.51633 | 64.1 |
|---|---|---|---|---|
| 33 | ∞ | 1.00 | | |
| Image plane | ∞ | | | |

Aspherical surface data

Thirteenth surface
K = −3.84955e−001    A4 = 6.19189e−006
A6 = 1.39029e−007    A8 = −4.48947e−009

Fourteenth surface
K = 4.06610e+002    A4 = 2.81417e−005
A6 = 4.04992e−008    A8 = −8.33981e−009

Twenty-first surface
K = −1.04071e+002    A4 = −2.47251e−005
A6 = 9.50983e−008    A8 = −8.10456e−009

-continued

Numerical Embodiment 7

Various data
Zoom ratio 3.80

| | Wide angle | Intermediate | Telephoto |
|---|---|---|---|
| Focal length | 10.35 | 27.13 | 39.33 |
| F-number | 2.88 | 3.98 | 4.58 |
| Half angle of view (degrees) | 39.2 | 17.0 | 11.5 |
| Image height | 6.80 | 8.00 | 8.00 |
| Total lens length | 76.88 | 93.54 | 104.31 |
| BF | 8.87 | 11.96 | 10.11 |
| d5 | 1.40 | 17.99 | 24.60 |
| d11 | 16.50 | 4.72 | 3.13 |
| d25 | 2.97 | 7.76 | 7.55 |
| d29 | 3.49 | 7.46 | 15.25 |
| d31 | 5.36 | 8.45 | 6.61 |

Zoom lens unit data

| Unit | First surface | Focal length |
|---|---|---|
| 1 | 1 | 68.72 |
| 2 | 6 | −10.94 |
| 3 | 12 | 18.17 |
| 4 | 26 | −61.51 |
| 5 | 30 | 41.93 |
| 6 | 32 | ∞ |

TABLE 1

| Conditional Expression | Numerical Embodiment | | | | | | |
|---|---|---|---|---|---|---|---|
| | 1 | 2 | 3 | 4 | 5 | 6 | 7 |
| (1) | −0.411 | −0.404 | −0.446 | −0.629 | −0.405 | −0.525 | −0.697 |
| (2) | 0.003 | −0.004 | −0.033 | 0.040 | 0.000 | 0.000 | 0.000 |
| (3) | −1.838 | −1.768 | −1.281 | −1.584 | −1.775 | −1.300 | −1.661 |
| (4) | 1.964 | 1.876 | 1.742 | 1.773 | 1.883 | 1.710 | 1.755 |
| (5) | −1.069 | −1.061 | −1.360 | −1.119 | −1.061 | −1.315 | −1.057 |
| (6) | −4.327 | −4.591 | −14.492 | −4.373 | −4.571 | −2.807 | −5.942 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-240825, filed Nov. 28, 2014, and Japanese Patent Application No. 2014-240827, filed Nov. 28, 2014, which are hereby incorporated by reference herein in their entirety.

What is claimed is:

1. A zoom lens, comprising, in order from an object side to an image side:
    a first lens unit having a positive refractive power;
    a second lens unit having a negative refractive power;
    a third lens unit having a positive refractive power;
    a fourth lens unit having a negative refractive power; and
    a fifth lens unit having a positive or negative refractive power, wherein intervals between adjacent lens units are changed during zooming, wherein the third lens unit includes four or more lenses, and in the third lens unit, a lens arranged closest to the image side, a lens arranged second when counted from the image side, and a lens arranged third when counted from the image side are arranged with air gaps therebetween, and wherein the following conditional expressions are satisfied:

$-0.8 < M1/ft < -0.4$, and $-15.00 < f4/fw < -2.50$, where fw represents a focal length of the zoom lens at a wide-angle end, ft represents a focal length of the zoom lens at a telephoto end, f4 represents a focal length of the fourth lens unit, and M1 represents a movement amount of the first lens unit during zooming from a wide-angle end to the telephoto end, provided that a sign of the movement amount is negative when the first lens unit is located on the object side at the telephoto end with respect to the wide-angle end, and is positive when the first lens unit is located on the image side at the telephoto end with respect to the wide-angle end.

2. A zoom lens according to claim 1, wherein the fourth lens unit is configured to move during focusing.

3. A zoom lens according to claim 1, wherein the following conditional expression is satisfied:

$-0.08 < (Ro31 - Ri32)/(Ro31 + Ri32) < 0.05$ where Ro31 represents curvature radius of a lens surface on the object side of the lens arranged closest to the image side in the third lens unit, and Ri32 represents curvature radius of a lens surface on the image side of the lens arranged second when counted from the image side in the third lens unit.

4. A zoom lens according to claim 1, wherein the following conditional expression is satisfied:

$-1.9 < f3/f2 < -1.2$ where f2 represents a focal length of the second lens unit, and f3 represents a focal length of the third lens unit.

5. A zoom lens according to claim 1, wherein the following conditional expression is satisfied:

$1.5 < f3/fw < 2.3$ where f3 represents a focal length of the third lens unit.

6. A zoom lens according to claim 1, wherein the following conditional expression is satisfied:

$-1.5 < f2/fw < -0.9$ where f2 represents a focal length of the second lens unit.

7. A zoom lens according to claim 1, wherein each of the fourth lens unit and the fifth lens unit consists of two or less lenses.

8. A zoom lens according to claim 1, wherein the first lens unit consists of four or less lenses.

9. A zoom lens according to claim 1, wherein during image stabilization, the lens arranged closest to the image side and the lens arranged second when counted from the image side in the third lens unit are configured to move in a direction having a component in a direction perpendicular to an optical axis.

10. An image pickup apparatus, comprising:
a zoom lens, comprising, in order from an object side to an image side:
a first lens unit having a positive refractive power;
a second lens unit having a negative refractive power;
a third lens unit having a positive refractive power;
a fourth lens unit having a negative refractive power; and
a fifth lens unit having a positive or negative refractive power, wherein intervals between adjacent lens units are changed during zooming, wherein the third lens unit includes four or more lenses, and in the third lens unit, a lens arranged closest to the image side, a lens arranged second when counted from the image side, and a lens arranged third when counted from the image side are arranged with air gaps therebetween, and wherein the following conditional expressions are satisfied:

$-0.8 < M1/ft < -0.4$, and $-15.00 < f4/fw < -2.50$, where fw represents a focal length of the zoom lens at a wide-angle end, ft represents a focal length of the zoom lens at a telephoto end, f4 represents a focal length of the fourth lens unit, and M1 represents a movement amount of the first lens unit during zooming from a wide-angle end to the telephoto end, provided that a sign of the movement amount is negative when the first lens unit is located on the object side at the telephoto end with respect to the wide-angle end, and is positive when the first lens unit is located on the image side at the telephoto end with respect to the wide-angle end; and an image pickup element configured to receive light of an image formed by the zoom lens.

11. A zoom lens, comprising, in order from an object side to an image side:
a first lens unit having a positive refractive power;
a second lens unit having a negative refractive power;
a third lens unit having a positive refractive power;
a fourth lens unit having a negative refractive power; and
a fifth lens unit having a positive or negative refractive power, wherein intervals between adjacent lens units are changed during zooming, wherein the second lens unit consists of four or less lenses, the third lens unit consists of four or more lenses, and of a lens arranged closest to the image side and a lens arranged second when counted from the image side in the third lens unit, one is a positive lens, and the other is a negative lens, and wherein the following conditional expressions are satisfied:

$-1.9 < f3/f2 < -1.2$, $-0.8 < M1/ft < -0.4$, and $-15.00 < f4/fw \leq -4.327$, where f2 represents a focal length of the second lens unit, f3 represents a focal length of the third lens unit, f4 represents a focal length of the fourth lens unit, ft represents a focal length of the zoom lens at a telephoto end, fw represents a focal length of the zoom lens at a wide-angle end, and M1 represents a movement amount of the first lens unit during zooming from the wide-angle end to the telephoto end, provided that a sign of the movement amount is negative when the first lens unit is located on the object side at the telephoto end with respect to the wide-angle end, and is positive when the first lens unit is located on the image side at the telephoto end with respect to the wide-angle end.

12. A zoom lens according to claim 11, wherein the fifth lens unit has the positive refractive power, and the second lens unit consists of three or four lenses.

13. A zoom lens according to claim 11, wherein a lens arranged second and a lens arranged third when counted from the image side in the third lens unit are arranged with an air gap therebetween.

14. A zoom lens according to claim 11, wherein the following conditional expression is satisfied:

$$1.5 < f3/fw < 2.3.$$

15. A zoom lens according to claim 11, wherein the following conditional expression is satisfied:

$$-1.5 < f2/fw < -0.9.$$

16. A zoom lens according to claim 11, wherein each of the fourth lens unit and the fifth lens unit consists of two or less lenses.

17. A zoom lens according to claim 11, wherein the first lens unit consists of four or less lenses.

18. A zoom lens according to claim 11, wherein during image stabilization, the lens arranged closest to the image side and the lens arranged second when counted from the image side in the third lens unit are configured to move in a direction having a component in a direction perpendicular to an optical axis.

19. A zoom lens according to claim 11, wherein the fourth lens unit is configured to move during focusing.

20. An image pickup apparatus, comprising:
   a zoom lens, comprising, in order from an object side to an image side:
      a first lens unit having a positive refractive power;
      a second lens unit having a negative refractive power;
      a third lens unit having a positive refractive power;
      a fourth lens unit having a negative refractive power; and
      a fifth lens unit having a positive refractive or negative power,
   wherein intervals between adjacent lens units are changed during zooming,
   wherein the second lens unit consists of four or less lenses, the third lens unit consists of four or more lenses, and of a lens arranged closest to the image side and a lens arranged second when counted from the image side in the third lens unit, one is a positive lens, and the other is a negative lens, and
   wherein the following conditional expressions are satisfied:

$$-1.9 < f3/f2 < -1.2,$$

$$-0.8 < M1/ft < -0.4, \text{ and}$$

$$-15.00 < f4/fw \leq -4.327,$$

where f2 represents a focal length of the second lens unit, f3 represents a focal length of the third lens unit, f4 represents a focal length of the fourth lens unit, ft represents a focal length of the zoom lens at a telephoto end, fw represents a focal length of the zoom lens at a wide-angle end, and M1 represents a movement amount of the first lens unit during zooming from the wide-angle end to the telephoto end, provided that a sign of the movement amount is negative when the first lens unit is located on the object side at the telephoto end with respect to the wide-angle end, and is positive when the first lens unit is located on the image side at the telephoto end with respect to the wide-angle end; and
   an image pickup element configured to receive light of an image formed by the zoom lens.

* * * * *